(12) United States Patent
Marcum et al.

(10) Patent No.: US 9,721,031 B1
(45) Date of Patent: Aug. 1, 2017

(54) ANCHORING BOOKMARKS TO INDIVIDUAL WORDS FOR PRECISE POSITIONING WITHIN ELECTRONIC DOCUMENTS

(71) Applicant: Amazon Technologies, Inc., Seattle, WA (US)

(72) Inventors: Stanton Todd Marcum, Seattle, WA (US); Michael Patrick Bacus, Seattle, WA (US); Timothy Thomas Gray, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 88 days.

(21) Appl. No.: 14/631,061

(22) Filed: Feb. 25, 2015

(51) Int. Cl.
*G06F 3/01* (2006.01)
*G06F 17/30* (2006.01)
*G06F 17/21* (2006.01)

(52) U.S. Cl.
CPC ...... *G06F 17/30884* (2013.01); *G06F 17/211* (2013.01)

(58) Field of Classification Search
CPC .................. G06F 17/30884; G06F 17/211
See application file for complete search history.

(56) References Cited

U.S. PATENT DOCUMENTS

| 5,761,485 A | * | 6/1998 | Munyan | G06F 15/0283 326/8 |
| 2006/0256083 A1 | * | 11/2006 | Rosenberg | G06F 3/013 345/156 |
| 2010/0225809 A1 | * | 9/2010 | Connors | G06F 15/0283 348/500 |
| 2012/0293528 A1 | * | 11/2012 | Larsen | G09G 3/20 345/589 |
| 2013/0229441 A1 | * | 9/2013 | Yano | G06F 3/0485 345/684 |
| 2013/0283145 A1 | * | 10/2013 | Argent | G06F 17/211 715/231 |
| 2014/0164593 A1 | * | 6/2014 | Murray | G06Q 30/02 709/224 |
| 2015/0177830 A1 | * | 6/2015 | Feng | G06F 3/017 345/156 |

\* cited by examiner

*Primary Examiner* — Asher Kells
(74) *Attorney, Agent, or Firm* — Pierce Atwood LLP

(57) ABSTRACT

Devices, systems and methods are disclosed for anchoring bookmarks to individual words for precise positioning within electronic documents. The bookmarks may be anchored based on user input selecting particular words, based on gaze tracking identifying most recently read words, or based on estimated reading speed. The bookmarks may be a link used to navigate within the document, may be used as an anchor for a new layout after content reflow or may be automatically saved when the e-reader turns off the display to provide the user with a most recently read passage. If a bookmark isn't anchored to specific words by the user, the device may anchor the bookmark to the beginning of a sentence or a paragraph including the recently read words determined using gaze tracking or estimated reading speed.

19 Claims, 17 Drawing Sheets

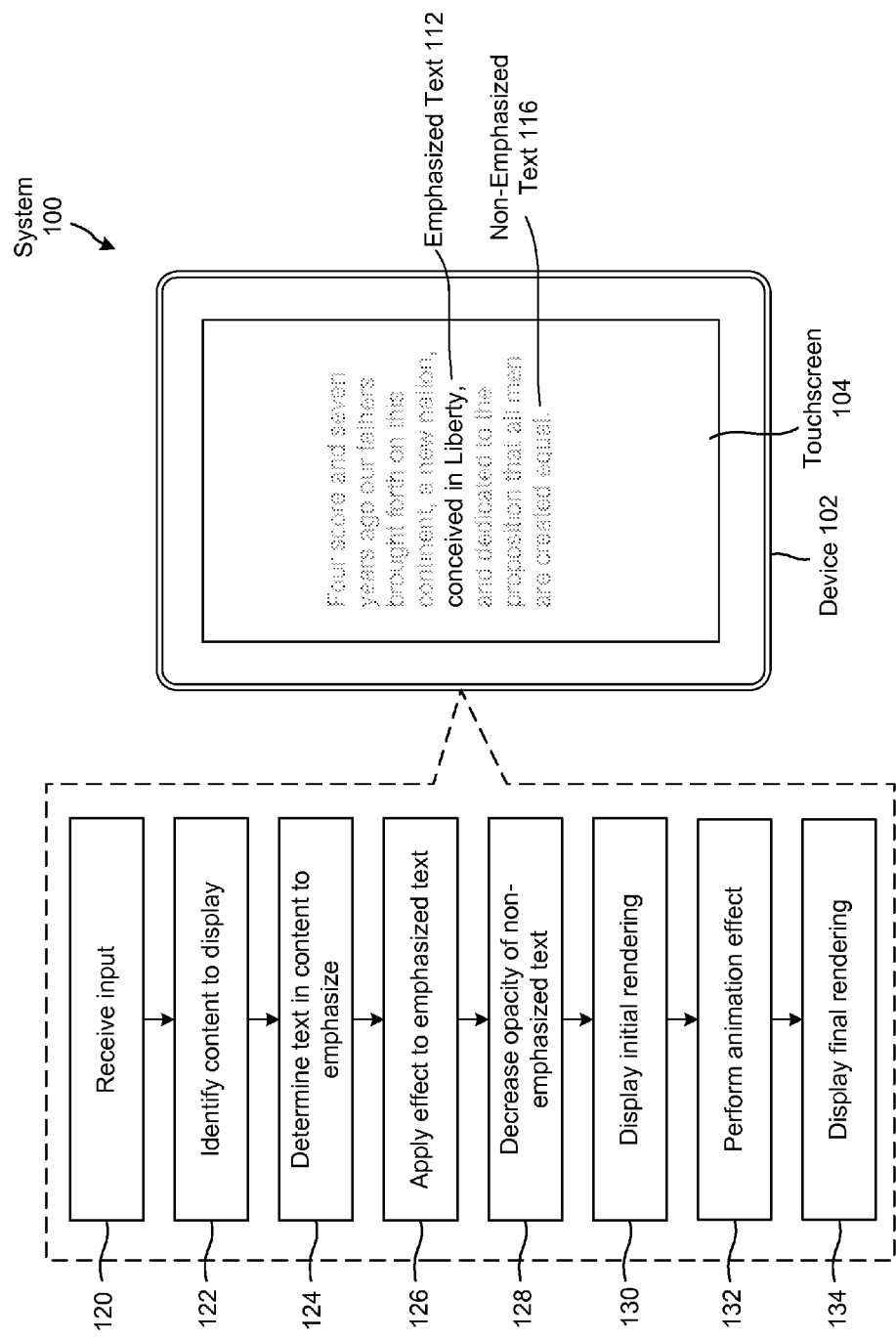

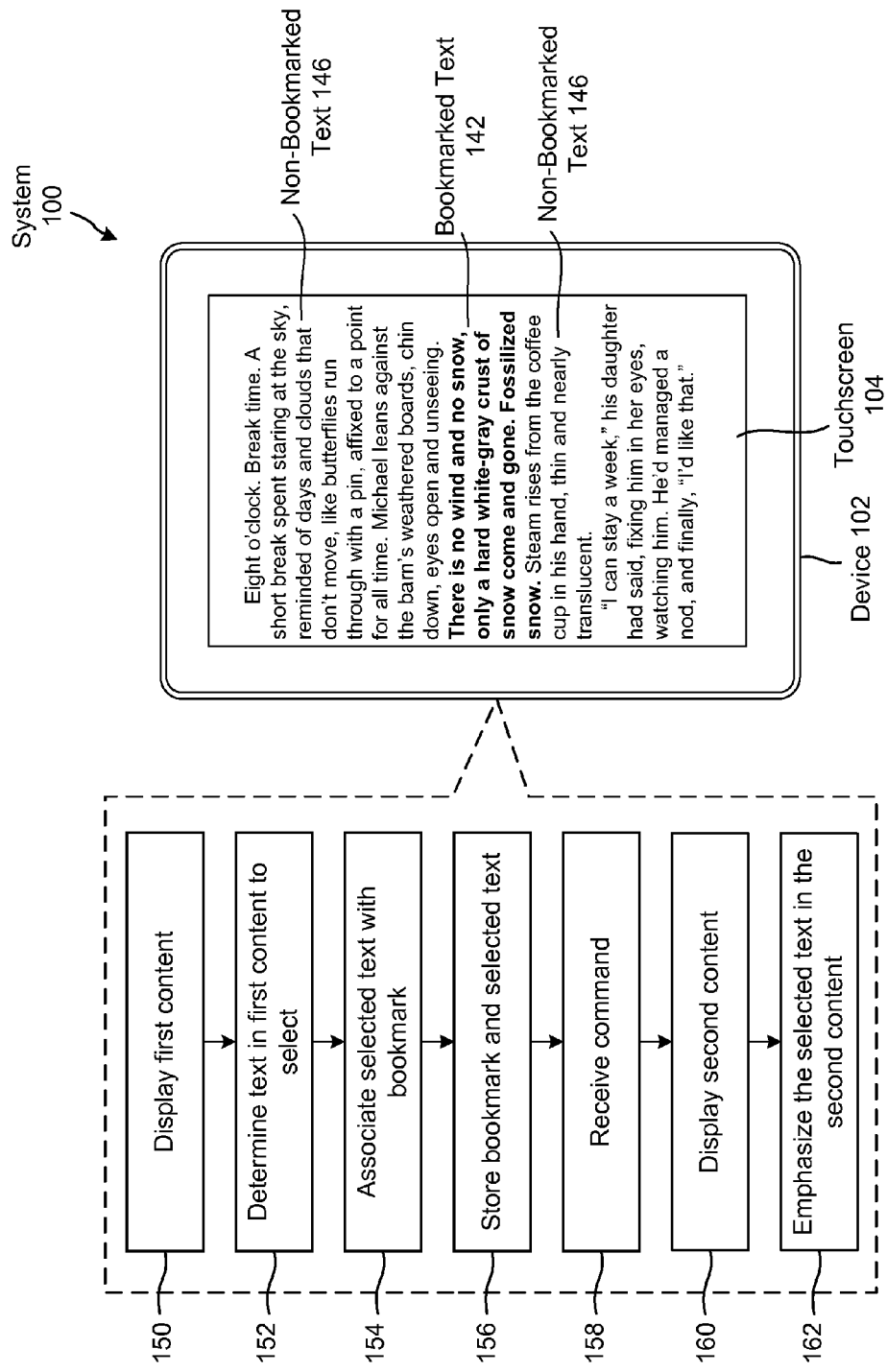

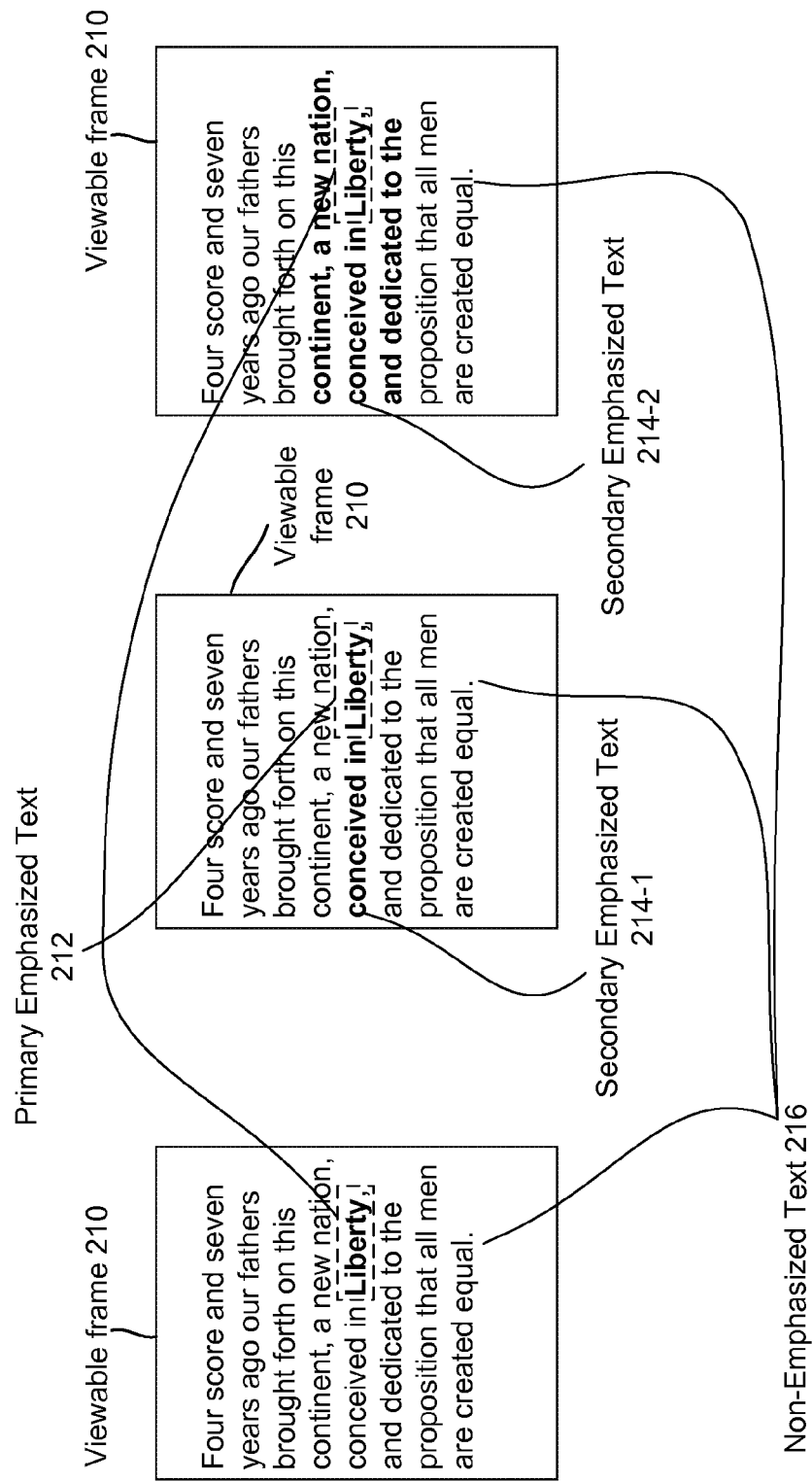

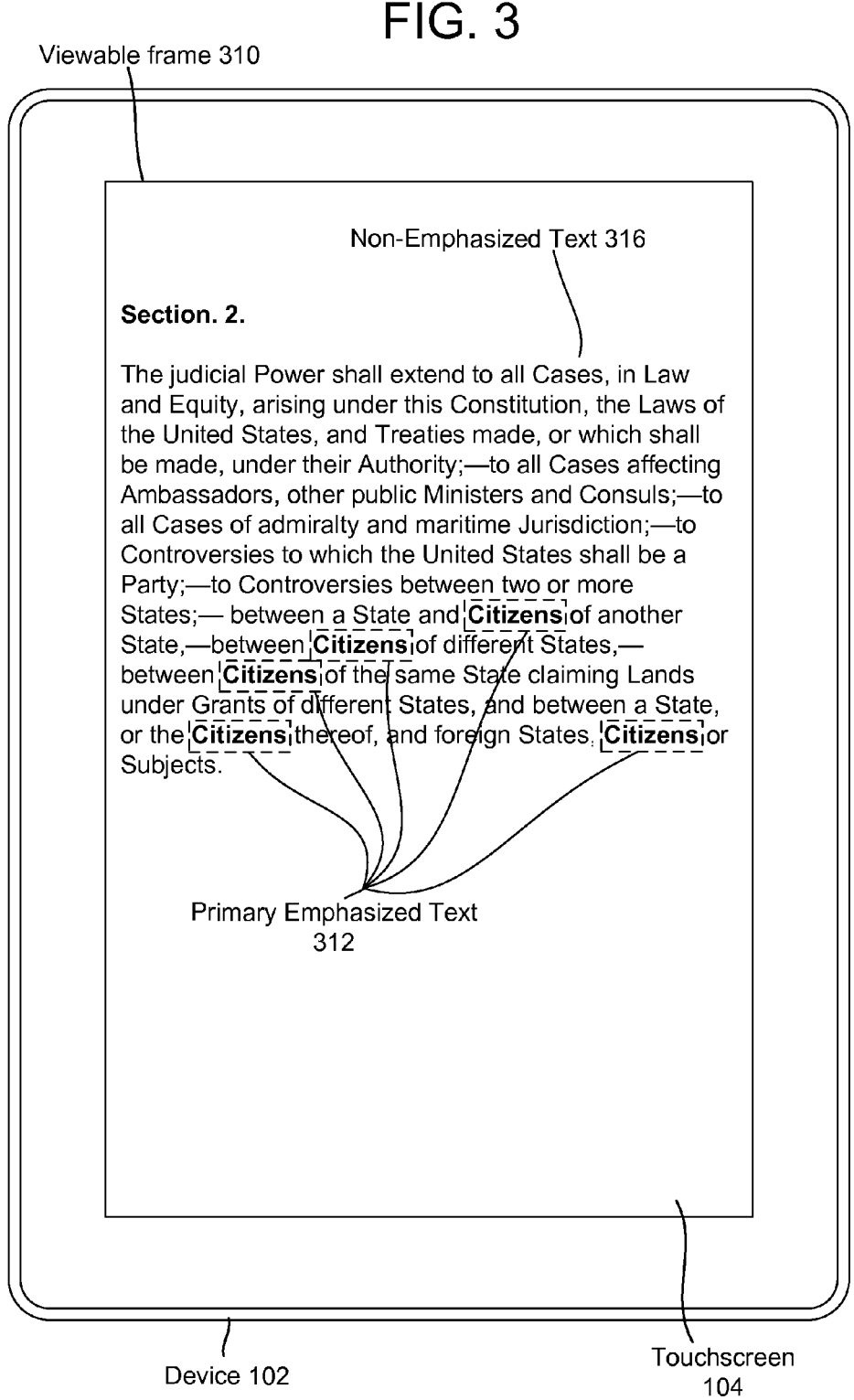

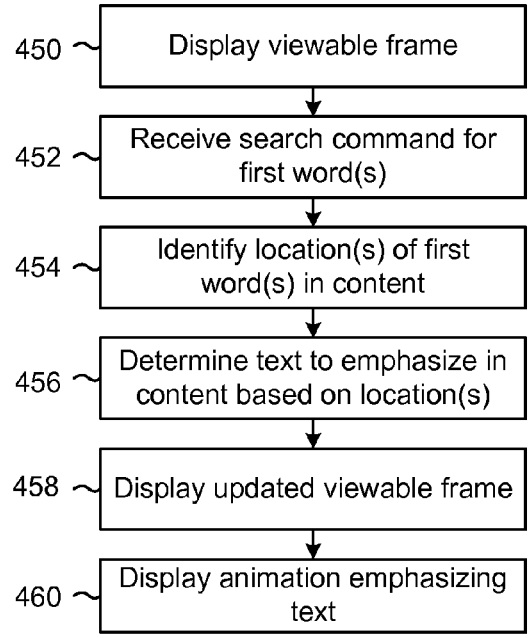
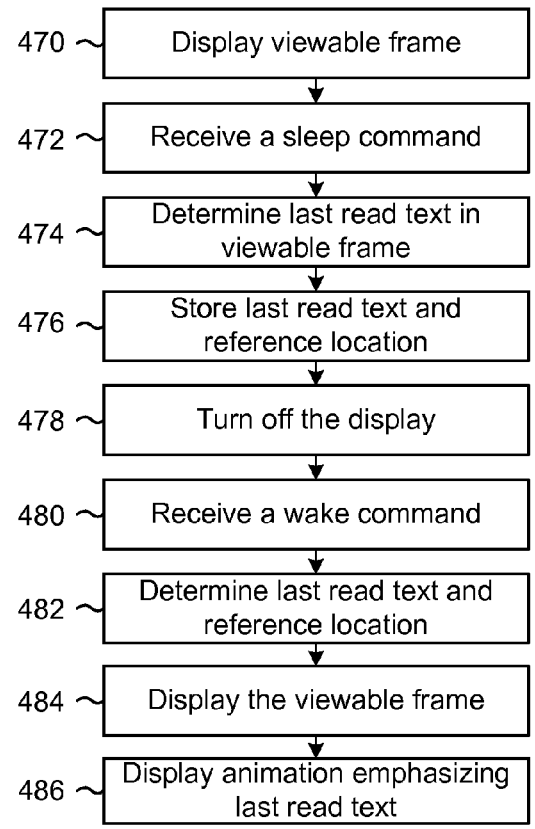

FIG. 7A

| Four score and seven years ago our fathers brought forth on this continent, a new nation, conceived in Liberty, and dedicated to the proposition that all men are created equal. | Four score and seven years ago our fathers brought forth on this continent, a new nation, conceived in Liberty, and dedicated to the proposition that all men are created equal. | Four score and seven years ago our fathers brought forth on this continent, a new nation, conceived in Liberty, and dedicated to the proposition that all men are created equal. |
|---|---|---|
| 710-1 | 710-2 | 710-3 |

FIG. 7B

| Four score and seven years ago our fathers brought forth on this continent, a new nation, conceived in Liberty, and dedicated to the proposition that all men are created equal. | Four score and seven years ago our fathers brought forth on this continent, a new nation, conceived in Liberty, and dedicated to the proposition that all men are created equal. | Four score and seven years ago our fathers brought forth on this continent, a new nation, conceived in Liberty, and dedicated to the proposition that all men are created equal. |
|---|---|---|
| 712-1 | 712-2 | 712-3 |

FIG. 7C

| Four score and seven years ago our fathers brought forth on this continent, a new nation, conceived in Liberty, and dedicated to the proposition that all men are created equal. | Four score and seven years ago our fathers brought forth on this continent, a new nation, conceived in Liberty, and dedicated to the proposition that all men are created equal. | Four score and seven years ago our fathers brought forth on this continent, a new nation, conceived in Liberty, and dedicated to the proposition that all men are created equal. |
|---|---|---|
| 714-1 | 714-2 | 714-3 |

FIG. 7D

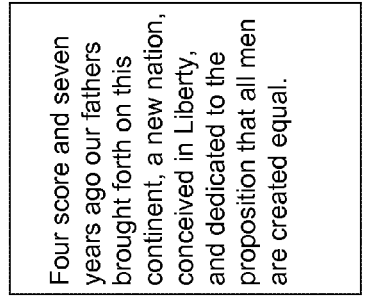

716-1 Liberty,

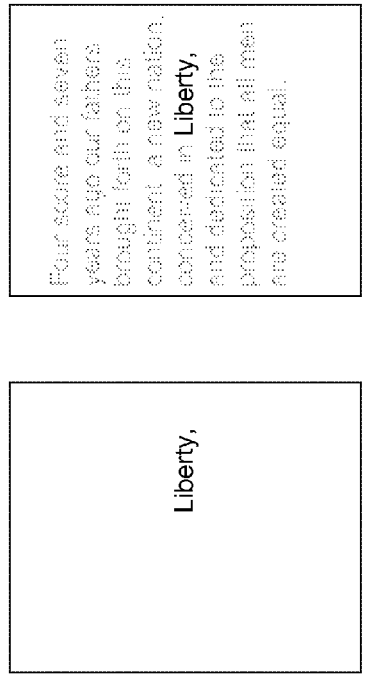

716-2

716-3 Four score and seven years ago our fathers brought forth on this continent, a new nation, conceived in Liberty, and dedicated to the proposition that all men are created equal.

716-4 Four score and seven years ago our fathers brought forth on this continent, a new nation, conceived in Liberty, and dedicated to the proposition that all men are created equal.

FIG. 7E

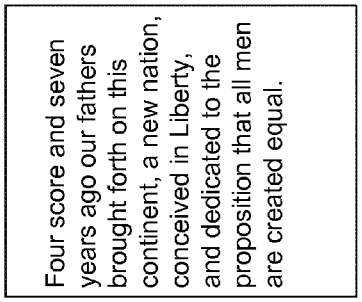

718-1 conceived in Liberty,

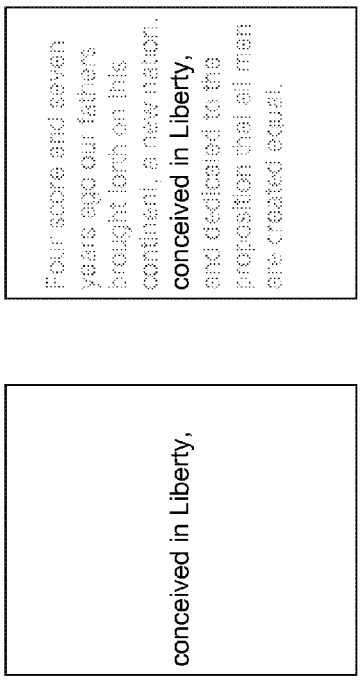

718-2

718-3 Four score and seven years ago our fathers brought forth on this continent, a new nation, conceived in Liberty, and dedicated to the proposition that all men are created equal.

718-4 Four score and seven years ago our fathers brought forth on this continent, a new nation, conceived in Liberty, and dedicated to the proposition that all men are created equal.

FIG. 9A

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone.
    Fossilized snow. Steam rises from the coffee cup in his hand, thin and nearly translucent.
  "I can stay a week," his daughter had said, fixing him in her eyes, watching him. He'd managed a nod, and finally, "I'd like that."
  Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

Viewable frame 910-1

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone.
    Fossilized snow. Steam rises from the coffee cup in his hand, thin and nearly translucent.
  "I can stay a week," his daughter had said, fixing him in her eyes, watching him. He'd managed a nod, and finally, "I'd like that."
  Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

Viewable frame 910-2

Viewable frame 910-3

"I can stay a week," his daughter had said, fixing him in her eyes, watching him. He'd managed a nod, and finally, "I'd like that."
  Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

Viewable frame 910-4

"I can stay a week," his daughter had said, fixing him in her eyes, watching him. He'd managed a nod, and finally, "I'd like that."
  Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

FIG. 9B

"I can stay a week," his daughter had said, fixing him in her eyes, watching him. He'd managed a nod, and finally, "I'd like that."
    Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

↖Viewable frame 912-1

"I can stay a week," his daughter had said, fixing him in her eyes, watching him. He'd managed a nod, and finally, "I'd like that."
    Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

↖Viewable frame 912-2

↙Viewable frame 912-3

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone.
        Fossilized snow. Steam rises from the coffee cup in his hand, thin and nearly translucent.
    "I can stay a week," his daughter had said, fixing him in her eyes, watching him. He'd managed a nod, and finally, "I'd like that."
    Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

↙Viewable frame 912-4

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone.
        Fossilized snow. Steam rises from the coffee cup in his hand, thin and nearly translucent.
    "I can stay a week," his daughter had said, fixing him in her eyes, watching him. He'd managed a nod, and finally, "I'd like that."
    Looking up he sees a hawk hunted overhead, follows its flight. A murder of crows is pecking at the ground near the tree line. He takes a sip of the coffee, dumps the rest, and heads back into his shop. Three tufts of brown grass protrude motionlessly from the gash where the coffee melted the snow.

ANCHORING BOOKMARKS TO INDIVIDUAL WORDS FOR PRECISE POSITIONING WITHIN ELECTRONIC DOCUMENTS

BACKGROUND

With the advancement of technology, the use and popularity of electronic devices, such as mobile devices, has increased considerably. Mobile devices, such as smart phones, electronic readers and tablet computers, typically display reflowable content such as reflowable documents.

BRIEF DESCRIPTION OF DRAWINGS

For a more complete understanding of the present disclosure, reference is now made to the following description taken in conjunction with the accompanying drawings.

FIGS. 1A-1B illustrate an overview of a system for implementing embodiments of the present disclosure.

FIGS. 2A-2C illustrate examples of primary emphasized text, secondary emphasized text and non-emphasized text according to embodiments of the present disclosure.

FIG. 3 illustrates an example of multiple selections of primary text according to embodiments of the present disclosure.

FIGS. 4A-4D are flowcharts conceptually illustrating example methods for emphasizing text according to embodiments of the present disclosure.

FIGS. 7A-7G illustrate examples of animations according to embodiments of the present disclosure.

FIGS. 9A-9B illustrate examples of animations according to embodiments of the present disclosure.

DETAILED DESCRIPTION

Figure 4A:
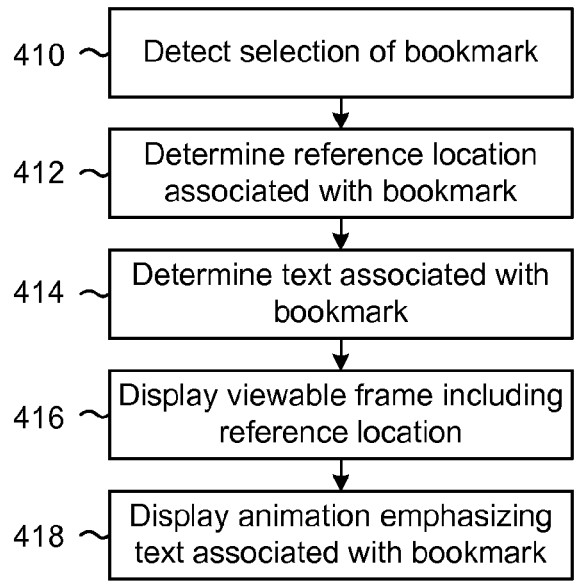

An electronic device may display content in a reflowable format that enables a presentation of the content to change based on settings of the device. While this reflowable format provides a user of the device the ability to customize the presentation based on personal preferences, the user may have difficulty maintaining context when the content refreshes during a reflow or jumping to a new page of the content. For example, the user may change a size of font or modify other formatting resulting in a reflow of content on the device. Prior to the reflow, a position of a reference point may be at a fixed position, such as a first sentence in a page of content being displayed in a top left corner of the device. After the reflow, the reference point is at a new position on the device and the user may lack context of what the new page is displaying. Therefore, the user may need to read the entire new page to identify a current location within the page.

To address these issues, devices, systems and methods are disclosed that emphasize text associated with a reference point when reflowing content or jumping to new content and perform an animation to attract the user's attention to the emphasized text. This may provide context or a visual landmark for the user to locate the current location within the page. For example, the device may highlight or embolden the emphasized text for a duration of time so that the user sees the reference point. Other text may be highlighted or bolded to draw the user's attention to the emphasized text. In addition, text not associated with the reference point may be deemphasized, such as by making the text transparent, to further draw the user's attention to the emphasized text.

FIG. 1A illustrates an overview of a system 100 for implementing embodiments of the disclosure. The system includes a computing device 102 having a display touchscreen 104. The touchscreen 104 is a display capable of receiving input via contact between an object (such as a finger, stylus, etc.) and the screen, although the disclosure is not limited thereto and the display 104 may be any display capable of displaying content. As shown in FIG. 1A, the display 104 includes emphasized text 112 and non-emphasized text 116.

As a user interacts with the device 102 and inputs commands to the device 102, the device 102 may determine that content being displayed needs to be reflowed. For example, if the input changes a layout of the content or a reference location associated with the input (such as selecting a hyperlink to a different location in the content) is outside of a current section of content, the device 102 may reflow the content using a new layout based on the input. As an example, the device 102 may display a first viewable frame using a first layout, receive the input and determine that the content needs to be reflowed to display a second viewable frame using a second layout. Reflowing the content may reflow an entirety of the content, such as a book or website, or may reflow a section of the content, such as a current section of the book or current section of the website. Changes to the presentation of the content typically require the content to be reflowed. For example, a landscape orientation displays content in the viewable frame differently than a portrait orientation and a smaller font may include more text in a single viewable frame than a larger font.

The device 102 may determine the layout of the current section and display content in the current section as discrete viewable frames. For example, the device 102 may separate the content into a series of consecutive viewable frames such that the viewable frames do not include redundant content. In this example, the device 102 may identify a viewable frame including a reference location and display the viewable frame. A relative position of the reference location on the display 104 may vary based on the layout of the section. For example, a first position of the reference location on the display 104 may have been a top left corner of a fifth page of the section prior to the device 102 reflowing the content, while a second position of the reference location on the display 104 may be a middle paragraph of a seventh page of the section after the content is reflowed. As used herein, a reference location is a location of words and/or formatting within an electronic publication (e.g., a 1100 word, a fourth chapter or the like) and may be determined using a convention having unique locations for each words and/or formatting of the publication. For example, the reference location may be an absolute word location indicating a single word within the publication based on a word count of the entire publication, with no two words having the same fixed location. Alternatively, the reference location may be a relative word location indicating a single word within the publication based on a word count for individual chapters, the reference location specifying the word location and the chapter number/section number or the like. Similarly, the reference location may be a character location or any other fixed location used to identify a unique location within the publication. As used herein, a relative position of the reference location may refer to physical position on the display 104 associated with a rendered display. The relative position corresponds to a relative location of the reference location on the rendered display, such as the 100th word on the rendered display. While the reference location may be identified in a rendered display using the relative location on the rendered display, as discussed above the reference location identifies a single fixed location within the publication.

Alternatively, the device 102 may determine the layout of the section and display the content as continuous viewable frames. For example, the device 102 may display a continuous portion of the content, such that the continuous portion of the content may scroll up or down to display the content. In this example, a viewable frame is a snapshot of the continuous portion of the content at a single moment, such that the content may be displayed using a series of viewable frames including redundant content. The device 102 may identify one of the viewable frames including the reference location and display the identified viewable frames. As the content may be displayed using a series of viewable frames and multiple viewable frames include the reference location, a relative position of the reference location on the display 104 may vary based on the layout of the section and the viewable frame being displayed.

To provide context to the user of the device 102, the device 102 may perform an animation to improve a visibility of the reference location and emphasized text 112 associated with the reference location. The animation may display a first visual effect and/or modify the emphasized text 112 (e.g., highlight, embolden, italicize, font color, font size, type of font or the like) to generated modified emphasized text and/or display a second visual effect and/or modify the non-emphasized text 116 (e.g., modify font or formatting, decrease an opacity of the non-emphasized text 116 so that the non-emphasized text 116 is faint or disappears entirely, etc.) to generate modified non-emphasized text. The animation may begin with a modified display (including modified primary text and/or modified non-emphasized text) and transition to a normal display (including normal emphasized text 112 and/or normal non-emphasized text 116, which is displayed substantially similarly, such as with identical fonts and formatting so as to read similarly and appear as a part of a cohesive block of text) either suddenly or gradually (e.g., in stages/intervals). For example, the animation may last a predetermined period of time (e.g., 200 to 500 milliseconds) or a predetermined number of frames (e.g., 20 screen refreshes). In addition, if the opacity of the non-emphasized text 116 is reduced so that the non-emphasized text 116 disappears entirely, the animation may display the emphasized text 112 by itself for a predetermined period of time before displaying the non-emphasized text 116 with the emphasized text 112.

As used herein, displaying a visual effect may include displaying modified formatting (e.g., highlight, embolden, italicize, font color, font size, type of font, decrease an opacity, other changes to font or formatting, etc.) for text associated with the visual effect. The visual effect may include sequences of formatting (e.g., blinking, flashing, or the like) that encompass animations, such as displaying the emphasized text 112 by itself for a predetermined period of time before displaying the non-emphasized text 116 with the emphasized text 112, or displaying transitions between an initial rendering and a final rendering of the text.

If the animation transitions suddenly, the device 102 may display the modified display for the period of time or the number of frames and then display the normal display at the conclusion of the period of time or the number of frames. For example, the device 102 may display the modified display for 200 ms to 500 ms and then display the normal display. If the animation transitions gradually, the device 102 may display the modified display at the beginning of the animation and transition through a series of intermediate stages/intervals before displaying the normal display after the period of time or the number of frames. For example, the device 102 may transition from the modified display to the normal display over 3 seconds, such as by initially displaying the modified display, displaying a first transition display after one second, displaying a second transition display after two seconds and displaying the normal display after three seconds. The period of time or number of frames may vary based on the content, an input prompting the animation, the device 102 and/or other factors. For example, an animation associated with a navigation link or bookmark may have a first period of time/number of frames, an animation associated with reflowing the content may have a second period of time/number of frames, an animation associated with a search command may have a third period of time/number of frames, etc.

The device 102 may receive (120) input to the device, may identify (122) content to display and may determine (124) text in content to emphasize. The input to the device may include a rotation of the device 102 to a new orientation, a selection of new font or formatting with which to display the content, a selection of a link to a new location within the content, a search command or the like. Examples of font or formatting changes may include changing font size, margins, line height, font family or the like. The device 102 may identify the content to display and the text in the content to emphasize based on the input. For example, the device 102 may set a current location as a reference location prior to reflowing the content, may set a location associated with a link or a search command as the reference location and may use the reference location to determine the content to display and the text to emphasize. Thus, text associated with the reference location may be selected as the text to emphasize (e.g., emphasized text 112).

The device 102 may apply (126) an effect to the emphasized text 112 to generate modified emphasized text. For example, the effect may modify a font and/or formatting of the emphasized text 112, such as add a highlight, embolden, italicize, change a font size, change a type of font or the like.

The device 102 may decrease (128) an opacity of non-emphasized text 116 to generate modified non-emphasized text. For example, the device 102 may decrease an opacity of the non-emphasized text 116 so that the non-emphasized text 116 is faint or disappears entirely, increasing a visibility of the emphasized text 112. The opacity of the non-emphasized text 116 may vary, from completely transparent (e.g., the non-emphasized text 116 is not displayed) to slightly transparent (e.g., the non-emphasized text 116 is lighter than the emphasized text 112). In addition, the device 102 may modify a font or formatting of the non-emphasized text 116, similar to described above with regard to the emphasized text 112, without departing from the present disclosure.

The device 102 may display (130) an initial rendering. The initial rendering may display a viewable frame including the modified emphasized text and/or the modified non-emphasized text. The device 102 may perform (132) an animation effect to transition between a modified display, including the modified emphasized text and the modified non-emphasized text, and a normal display, including the emphasized text 112 and the non-emphasized text 116, which are displayed substantially similarly. For example, the device 102 may decrease an intensity value associated with the effect on the emphasized text 112 and increase an opacity of the non-emphasized text 116 gradually over the course of the animation effect until the emphasized text 112 and the non-emphasized text 116 have similar or identical fonts and formatting. Alternatively, the device 102 may maintain the effect on the emphasized text 112 and the opacity of the non-emphasized text 116 for a period of time and then decrease/remove the effect in stages or in a single step.

As part of the animation effect, the device 102 may change the opacity of the non-emphasized text 112 uniformly or non-uniformly. As an example of uniformly changing the opacity, an opacity of the non-emphasized text 116 within the viewable frame may be increased similarly and the non-emphasized text 116 may be slowly faded in as a group. As an example of non-uniformly changing the opacity, an opacity of the non-emphasized text 116 within the viewable frame may be increased differently based on a position of the non-emphasized text 116 within the viewable frame, such that first portions of the non-emphasized text 116 are faded in more quickly than second portions of the non-emphasized text 116. Thus, the device 102 may dynamically determine an animation fade of the non-emphasized text 116.

An example of dynamically determining the animation fade may be to increase the opacity of the non-emphasized text 116 using a gradient or a normal distribution. In a first example, an opacity of portions of the non-emphasized text 116 closer to a center of the animation fade may increase at a faster rate than an opacity of portions of the non-emphasized text 116 further from the center of the animation fade, such that the animation fades in using an inside-out approach. In a second example, the opacity of portions of the non-emphasized text 116 further from the center of the animation fade may increase at a faster rate than the opacity of portions of the of the non-emphasized text 116 closer to the center of the animation fade, such that the animation fades in using an outside-in approach. The device 102 may determine a position of a center of the animation fade based on location(s) of the emphasized text 112. For example, if the emphasized text 112 includes a single region of emphasized text 112, the center of the animation fade may be positioned over the single region of emphasized text 112. If the emphasized text 112 includes multiple regions of emphasized text 112, the position of the animation fade may vary. As a first example, the center of the animation fade may be positioned to be central to the multiple regions of emphasized text 112. As a second example, the animation fade may be centered on a single region of emphasized text 112. As a third example, a size of the animation fade may be reduced and the animation fade may be positioned on each of the multiple regions of emphasized text 112. Thus, the animation fades may encircle the multiple regions of emphasized text 112 individually.

The device 102 may display (134) a final rendering. The final rendering may display the viewable frame including the emphasized text 112 and the non-emphasized text 116. Thus, the content displayed in the viewable frame may have a uniform formatting and/or font.

For ease of explanation this disclosure will refer to text, images, tables or other forms or types of content as "text." For example, in one instance "primary text" may refer to a sentence, while in another instance "primary text" may refer to an image and an associated sentence. Thus, references throughout the disclosure to "primary text," "supplementary text" and "non-emphasized text" are intended to include alternative types of content and are not limited to strings of alphanumeric characters.

To emphasize particular text, the device 102 may differentiate between primary text, secondary text and non-emphasized text. For example, primary text may be specific number(s), word(s), phrase(s), sentence(s), paragraph(s) or other content within a viewable frame that the device 102 is emphasizing. The primary text may be emphasized using multiple methods, such as highlighting the primary text, changing a color of the primary text, emboldening the primary text, italicizing the primary text, changing an opacity of surrounding content to emphasize the primary text or the like. In addition to the primary text, the device 102 may emphasize secondary text to increase a visibility of the primary text. For example, the secondary text may be text in proximity to the primary text, such as the remaining text located on a row with the primary text or multiple rows in proximity to the primary text, and emphasizing the secondary text may draw attention to the primary text. In addition, text displayed that is not included in the primary text or the secondary text is non-emphasized text, which may be displayed unchanged or may be modified to improve a visibility of the primary text. For example, an opacity of the non-emphasized text may be modified to improve a visibility of the primary text and/or the secondary text.

FIG. 1B illustrates a computing device 102 having a display 104. The display 104 may be a touchscreen, that is a display capable of receiving input via contact between an object (such as a finger, stylus, etc.) and the screen, although the disclosure is not limited thereto and the display 104 may be any display capable of displaying content. As shown in FIG. 1B, the display 104 includes bookmarked text 142 and non-bookmarked text 146. As a user interacts with the device 102 and inputs commands to the device 102, the device 102 may select text, associate the selected text with a reference location and store the selected text and the associated reference location as a bookmark.

The device 102 may display (150) first content, such as an electronic publication, electronic document, website or the like (hereinafter, "publication"). The device 102 may determine (152) text in the first content to select. For example, the device 102 may determine the text to select based on user input (e.g., a select command), gaze tracking, estimated reading speed or the like, as will be discussed in greater detail with regard to FIGS. 10A-10C. The device 102 may associate (154) the selected text with a bookmark and may store (156) the bookmark and the selected text, along with a reference location or other information.

Using steps 150-156, the device 102 may store a bookmark identifying selected text associated with a reference location. At a later point in time, the device 102 may receive (158) a command, may display (160) second content and may emphasize (162) the selected text in the second content. In some examples, the second content may be the same as the first content, but the disclosure is not limited thereto.

The device 102 may use the bookmark to navigate, such as by linking from a first location to the reference location.

For example, the device 102 may display a table of contents, index or content including the bookmark and may receive an input selecting the bookmark. In response to receiving the input, the device 102 may display content at the reference location emphasizing the selected text. Alternatively, the device 102 may use the bookmark to maintain user position, such as during a reflow operation, an exit command, a sleep command or the like. For example, the device 102 may display a first layout and may receive an input directing the device 102 to display a second layout. The device 102 may reflow content or otherwise modify the layout and display the second layout emphasizing the selected text. As another example, the device 102 may display first content (such as a page of text) and may receive an exit command to close the first content. If the device 102 later reopens the first content, the device 102 may display the first content at the reference location while emphasizing the selected text. As a final example, the device 102 may display the first content and may receive a sleep command or no input for a duration of time exceeding a first threshold (such as a time threshold representing a power save timer). In response to the sleep command or exceeding the first threshold, the device 102 may turn off (e.g., deactivate) the display 104. If the device 102 later receives a wake command to turn on (e.g., activate) the display 104, the device 102 may display the first content at the reference location while emphasizing the selected text.

As used herein, a bookmark may be any stored reference location used to identify a particular location within an electronic publication, electronic document or other content. Some bookmarks may be anchored to specific text selected by a user or selected automatically by the device 102. In some examples, a user of the device 102 may direct the device 102 to select text and generate a bookmark for the selected text. In other examples, the user may direct the device 102 to generate a bookmark and the device 102 may optionally select text to associate with the bookmark. In other examples, the device 102 may select text and generate a bookmark without user input. These bookmarks may include a reference location associated with a last user input, last read text, last page read, last content interacted with or the like. Thus, bookmarks may be used by the device 102 to identify different reference locations to facilitate viewing by the user, and each bookmark may be associated with or anchored to particular text. The device 102 may include index(es) for user-created bookmarks, automatically-created bookmarks and/or bookmarks in general. In addition, the device 102 may display a visual indicator for a bookmark, such as user-created bookmark, while displaying content associated with the bookmark.

The device 102 may select text using a select command, gaze tracking, estimated reading speed or the like, as will be discussed in greater detail with regard to FIGS. 10A-10C. The device 102 may determine to generate a bookmark based on a bookmark command (e.g., the user uses a contextual menu to command the device 102 to create a bookmark), a drag command (e.g., the user interacts with the display 104 to select text and drag the selected text to a bookmark icon or a particular location on the display 104; alternatively, the user interacts with the display 104 to drag a bookmark icon to particular text), an exit command (e.g., the user commands the device 102 to exit a current application associated with selected text, such as by closing a publication), a sleep command (e.g., the user commands the device 102 to turn off (e.g., deactivate) the display 104), a time delay (e.g., the device 102 detects no input for a duration of time exceeding a threshold), or the like. Bookmarks created based on the bookmark command and the drag command are examples of user-created bookmarks (e.g., the user intentionally creates a bookmark), whereas bookmarks created based on the exit command, the sleep command, the time delay or other functions are examples of automatically-created bookmarks (e.g., the device 102 creates a bookmark to provide improved functionality to the user).

Bookmarks may be shared across multiple devices. For example, bookmarks stored on the device 102 may be associated with a user identification (ID) and stored remotely, allowing other devices associated with the user ID to access the bookmarks. Thus, a bookmark may be stored by a smart phone associated with a user ID and the bookmark may be accessed by the smart phone, a computer, an electronic reader or the like associated with the user ID.

Bookmarks generated without user input may be stored temporarily or overwritten by subsequent bookmarks. For example, the device 102 may generate a first bookmark associated with first text in a first location, corresponding to last read text in a first electronic publication, and may generate a second bookmark associated with second text in a second location, corresponding to last read text in a second electronic publication. If the user opens the first electronic publication and continues reading, the device 102 may update the first bookmark to be associated with third text in a third location, corresponding to the last read text in the electronic publication. Thus, the device 102 may store multiple bookmarks associated with reference locations in electronic publications, electronic documents or the like.

The device 102 may use bookmarks to track reference locations of the last read text in multiple electronic publications. Therefore, a user may exit a first publication and select a second publication to open and view on the device 102. In response, the device 102 may determine a reference location of the last read text in the second publication using a stored bookmark associated with the second publication. After determining the reference location, the device 102 may display content from the second publication, including the reference location, and may display an animation emphasizing the last read text.

The device 102 may include a homescreen command directing the device 102 to exit an open publication or other application and return to a homescreen. The device 102 may display the homescreen, which may identify different applications and/or publications available on the device 102. For example, the device 102 may display a bookshelf or other visual indication identifying some of the electronic publications available to read using the device 102. A first visual indication associated with a first electronic publication may include a title, author, cover art or the like associated with the first electronic publication. As discussed above, opening the first publication (e.g., selecting the first visual indication) may cause the device 102 to display content from the first publication based on a reference location associated with last read text. However, in addition to emphasizing the last read text upon displaying content from the first publication, the device 102 may excerpt a portion or the entirety of the last read text and display the excerpt as part of or in proximity to the first visual indication on the homescreen. Therefore, the homescreen may include visual indications and excerpts associated with multiple publications stored on the device 102.

FIGS. 2A-2C illustrate examples of primary emphasized text, secondary emphasized text and non-emphasized text according to embodiments of the present disclosure. As illustrated in FIGS. 2A-2C, primary emphasized text 212 may include a single word (e.g., "Liberty") within content displayed in a viewable frame. As discussed above, however, the disclosure is not limited thereto and the primary text 212 may include specific number(s), word(s), phrase(s), sentence(s), paragraph(s), other content or the like. In some embodiments, the primary text 212 may include additional data associated with the primary text 212, such as an image, table or the like.

As illustrated in FIG. 2A, the primary text 212 is a single word that is emboldened (i.e., in a bold faced font). Thus, for FIG. 2A, non-emphasized text 216 includes the remaining text displayed, including text in proximity to the primary text 212 and within the same row as the primary text 212. In contrast, FIG. 2B illustrates first secondary emphasized text 214-1, which includes text sharing a row with the primary text 212. Thus, for FIG. 2B, the non-emphasized text 216 includes remaining text displayed that doesn't share the row with the primary text 212. In another example, FIG. 2C illustrates second secondary emphasized text 214-2, which includes text sharing the row with the primary text 212 and text in adjacent rows to the row with the primary text 212. Thus, for FIG. 2C, the non-emphasized text 216 includes remaining text displayed that doesn't isn't in proximity (e.g., adjacent to or sharing a row with, in this example) the primary text 212.

FIG. 3 illustrates an example of multiple selections of primary text according to embodiments of the present disclosure. As illustrated in FIG. 3, the device 102 displays content in a viewable frame including primary emphasized text 312 and non-emphasized text 316. In this example, the primary emphasized text 312 includes multiple iterations of "Citizens" displayed simultaneously in a bold font (e.g., emboldened). The animation techniques discussed in greater detail below in reference to FIGS. 4A-4D, 5 and 6 may be performed to emphasize the multiple iterations of the primary emphasized text 312.

FIGS. 4A-4D illustrate flowcharts conceptually illustrating example methods for emphasizing text according to embodiments of the present disclosure. As illustrated in FIG. 4A, the device 102 may detect (410) a selection of a bookmark, may determine (412) a reference location associated with the bookmark, and determine (414) text associated with the bookmark. For example, a user of the device 102 may select a link in an index or a table of contents and the device 102 may determine a referenced location in the content associated with the link and primary text at the reference location in the content. The device 102 may display (416) a viewable frame including the reference location. For example, the device 102 may display the content in a viewable frame including the reference location in the content. In some examples, the location will be associated with a beginning of the page, such as a beginning of a chapter in an electronic book. However, the primary text associated with the link may not be located at the top of the page displayed by the device 102. Instead, the primary text may be embedded within a paragraph or displayed lower on the page. As a first example, selecting a chapter in a table of contents may result in the device 102 displaying the beginning of the chapter with the first sentence selected as the primary text. As a second example, selecting an index entry in an index may result in the device 102 displaying a page associated with the index entry, with a word, sentence or other text displayed on the page selected as the primary text. To improve a visibility of the primary text to the user, the device 102 may display (418) an animation emphasizing text associated with the bookmark. The animation may improve a visibility of the primary text as discussed above with regard to FIG. 1A and in greater detail below with regard to FIG. 6.

Figure 4B:
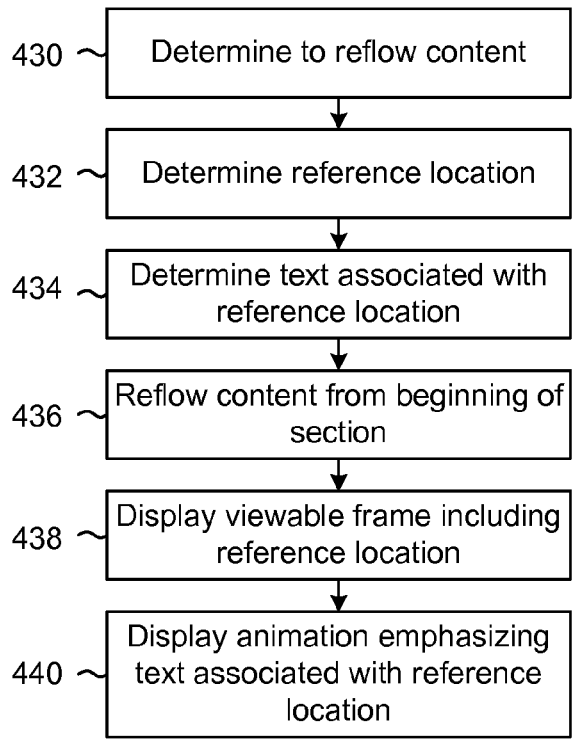

As illustrated in FIG. 4B, the device 102 may determine (430) to reflow content. For example, the device 102 may display a first viewable frame using a first layout and receive an input, such as a rotation of the device 102 to a new orientation or a selection of new font or formatting with which to display the content, and determine that the content needs to be reflowed to display a second viewable frame using a second layout. Examples of font or formatting changes may include changing font size, margins, line height, font family or the like. Reflowing the content may reflow an entirety of the content, such as a book or website, or may reflow a section of the content, such as a current section of the book or current section of the website. Changes to the presentation of the content typically require the content to be reflowed. For example, a landscape orientation includes content in the viewable frame differently than a portrait orientation and a smaller font may include more text in a single viewable frame than a larger font.

The device 102 may determine (432) a reference location in the content. For example, a reference location may be a beginning of a viewable frame displayed on the device 102, such as a current location in the content corresponding to a top left corner of the display 104. Alternatively, the device 102 may identify a beginning of a first paragraph in the viewable frame. In other examples, the device 102 may identify a reference location using eye tracking, a position of a cursor within the viewable frame, a position of most recent contact on the display 104, a link or a reference location included in the viewable frame, a position of a marker, a position of a bookmark, a position of a footnote, a position of an accessibility feature, based on a priority location within the viewable frame, a semantic element or the like. A priority location may be a beginning of a paragraph or another visual landmark in the viewable frame that a user may use as a reference point, while a semantic element may be embedded in the content based on the format of the content. For example, if the device 102 displays an image or a table, the device 102 may identify the image or the table as the reference location. Alternatively, if the device 102 displays an object included in a table of contents or an index, the device 102 may identify a location of the object as the reference location.

The device 102 may determine (434) text associated with the reference location, which may vary based on the reference location and a type of content at the reference location. For example, a table of contents or index may link to particular text within the content and the device 102 may determine that the particular text is associated with the reference location. If the reference location is associated with an image or a table, the text associated with the reference location may include a word or sentence associated with the image or table, or may include the image or table itself. The text associated with the reference location may be a semantic related component, and the device 102 may determine a smallest logical semantic element. For example, the smallest logical semantic element may be a title of the image or table, although the device 102 may identify additional text to include along with the smallest logical semantic element. Other examples of semantic elements are headers, sections, footers, navigation links, images, tables, figures, captions or the like, which may be based on a format of the content.

The device 102 may reflow (436) content from a beginning of a current section. For example, the device 102 may determine a current section and identify a location of the beginning of the current section. The device 102 may determine a layout of the content from the beginning of the current section until an end of the current section. As discussed above, the current section may be a portion of the total content or may be an entirety of the total content. Examples of a portion of the total content may include a chapter of an electronic book, a section within a chapter of an electronic book, or a section of a website. Examples of an entirety of the total content may be a complete website, a complete electronic document or an entire electronic book. By dividing the content into smaller sections, the device 102 may reflow and display the current section with a reduced latency as the device 102 reflows a smaller portion of the total content.

The device 102 may display (438) a viewable frame including the reference location. As the layout is determined based on a beginning of the section, the device 102 may determine the layout of the section and display the content as discrete viewable frames. For example, the device 102 may separate the content into a series of consecutive viewable frames such that the viewable frames do not include redundant content. In this example, the device 102 may identify the viewable frame including the reference location and display the viewable frame. A relative position of the reference location on the display 104 may vary based on the layout of the section. For example, a first position of the reference location on the display 104 may have been a top left corner of a fifth page of the section prior to the device 102 reflowing the content, while a second position of the reference location on the display 104 may be a middle paragraph of a seventh page of the section after the content is reflowed.

Alternatively, the device 102 may determine the layout of the section and display the content as continuous viewable frames. For example, the device 102 may display a continuous portion of the content, such that the continuous portion of the content may scroll up or down to display the content. In this example, a viewable frame is a snapshot of the continuous portion of the content at a single moment, such that the content may be displayed using a series of viewable frames including redundant content. The device 102 may identify one of the viewable frames including the reference location and display the identified viewable frames. As the content may be displayed using a series of viewable frames and multiple viewable frames include the reference location, a relative position of the reference location on the display 104 may vary based on the layout of the section and the viewable frame being displayed.

To increase a visibility of text associated with the reference location, the device 102 may display (440) an animation emphasizing the text associated with the reference location. The animation is described above with regard to FIGS. 1A and 1n greater detail below with regard to FIG. 6.

As illustrated in FIG. 4C, the device 102 may display (450) a viewable frame, such as a portion of content. The device 102 may receive (452) a search command for first word(s) and may identify (454) location(s) of the first word(s) in the content. For example, the device may receive a search command to search for "Citizens" and may identify multiple iterations of "Citizens," as illustrated in FIG. 3. The device 102 may then determine (456) text to emphasize in the content based on the location(s). For example, the device 102 may select the first word(s) as the text to emphasize or as primary text to emphasize. Alternatively or additionally, the device 102 may select text sharing a row with the first word(s) as the text to emphasize or as secondary text to emphasize. Thus, the device 102 may identify the first word(s) and/or text in proximity to the first words as text to emphasize.

The device 102 may display (458) an updated viewable frame. In some examples, the device 102 may display the viewable frame from step 450, for example if the first word(s) are located within the viewable frame. In other examples, the device 102 may display a second viewable frame, such as a subsequent viewable frame. If the content is displayed as discrete viewable frames, the device 102 may display the second viewable frame when the first word(s) are not located within the viewable frame. If the content is displayed as continuous viewable frames, the device 102 may display the second viewable frame when the first word(s) are not located within a particular area within the viewable frame. For example, if a position of the first word(s) in the viewable frame is at the bottom of the viewable frame, the device 102 may display the second viewable frame so that a position of the first word(s) in the second viewable frame are in the middle of the second viewable frame.

To increase a visibility of the text to emphasize, the device 102 may display (460) an animation emphasizing the text. The animation is described above with regard to FIGS. 1A and 1n greater detail below with regard to FIG. 6.

As illustrated in FIG. 4D, the device 102 may display (470) a viewable frame, such as a portion of content. The device 102 may receive (472) a sleep command, which is a command to turn off the display 104 of the device 102. While FIG. 4D illustrates the device 102 receiving sleep/wake commands, the device 102 may instead receive exit/open commands, which causes the device 102 to exit a currently viewed document or content and open the document or content at a later point in time.

In response to the sleep command, the device 102 may determine (474) last read text in the viewable frame, may store (476) the last read text and the reference location, and may turn off (478) the display 104. The device 102 may determine the last read text in the viewable frame using a reading speed and an amount of time the viewable frame was displayed prior to receiving the sleep command. The reading speed may be calculated as a total average reading speed for a user, a weighted average reading speed for the user emphasizing recent reading speeds, an average reading speed for all users or the like, as will be discussed in greater detail below with regard to FIG. 10C. As an alternative, the device 102 may determine the last read text in the viewable frame using gaze tracking techniques which may track the gaze of the user, determine a location on the display 104 of the device 102 corresponding to the gaze, determine content in the viewable frame corresponding to the location on the display 104 and therefore track a progress of the user in viewing the viewable frame.

At a later point in time, the device 102 may receive (480) a wake command to turn on (e.g., activate) the display 104. Alternatively, as discussed above, the device 102 may have closed the document in response to an exit command and may receive an open command to open the document. In response to the wake command, the device 102 may determine (482) the last read text and the reference location, such as by retrieving the last read text and the reference location from storage. The device 102 may display (484) the viewable frame based on the reference location and may display (484) an animation emphasizing the last read text. Thus, after a sleep/wake command cycle or an exit/open command cycle, the device 102 may display the viewable frame with an animation emphasizing the last read text to provide context for the user.

Figure 5:
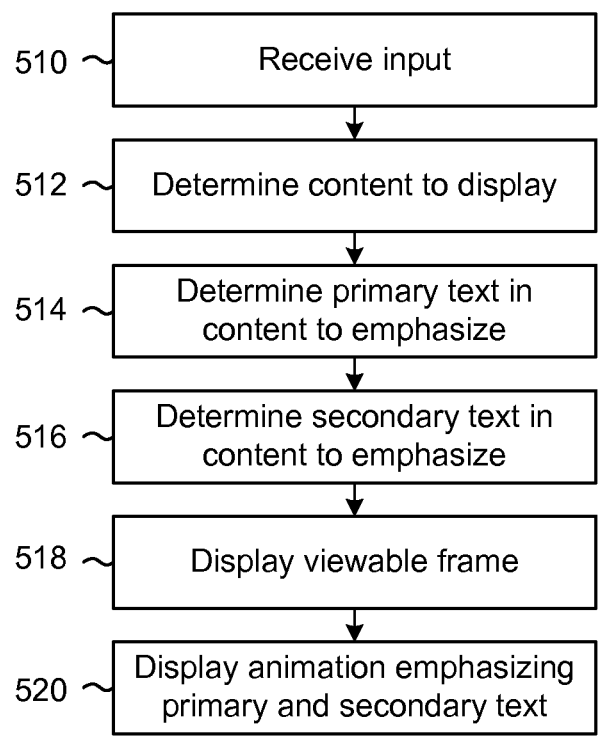
FIG. 5 is a flowchart conceptually illustrating an example method for emphasizing text according to embodiments of the present disclosure.

While the animation techniques may be performed in multiple different scenarios, a general example is illustrated in FIG. 5. FIG. 5 illustrates a flowchart conceptually illustrating an example method for emphasizing text according to embodiments of the present disclosure. For example, the device 102 may receive (510) an input, such as a rotation of the device 102 to a new orientation, a selection of new font or formatting with which to display the content, a selection of a link to a new location within the content, a search command or the like. The device 102 may determine (512) a viewable frame to display. For example, the device 102 may reflow the content using a new layout based on the change in orientation, the new font or formatting or the new location within the content, or the device 102 may display a new location based on the search command.

The device 102 may determine (514) primary text in the content to emphasize. For example, the primary text may be associated with a reference location prior to reflowing the content, associated with the link to the new location or associated with the search command. Using the primary text, the device 102 may determine (516) secondary text in the content to also emphasize. The secondary text may be in proximity to the primary text, such as text sharing a row with the primary text, in adjacent rows or within a range of rows of the primary text.

The device 102 may display (518) a viewable frame, which may include the reflowed content using the new layout, content associated with the new location or the current content. The device 102 may then display (520) animation emphasizing the primary text and the secondary text. For example, the device 102 may generate an animation and display the animation to increase a visibility of the primary text and/or the secondary text within the content.

Figure 6:
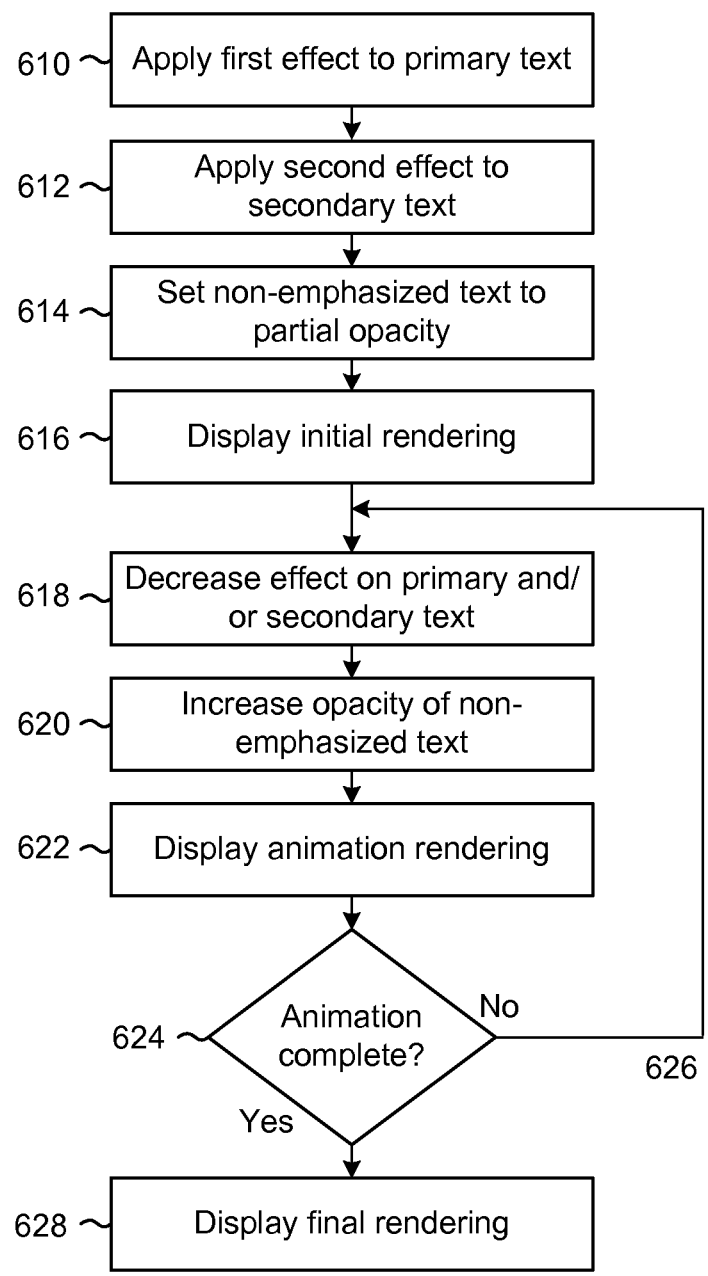
FIG. 6 is a flowchart conceptually illustrating an example method for animating emphasized text according to embodiments of the present disclosure.

FIG. 6 illustrates a flowchart conceptually illustrating an example method for animating emphasized text according to embodiments of the present disclosure. The animation may modify the primary text and/or secondary text (e.g., highlight, embolden, italicize, font color, font size, type of font or the like) and the non-emphasized text (e.g., modify font or formatting, decrease an opacity of the non-emphasized text so that the non-emphasized text is faint or disappears entirely, etc.). The animation may begin with a modified display (including modified primary text, modified secondary text and/or modified non-emphasized text) and transition to a normal display (including normal primary text, normal secondary text and/or normal non-emphasized text) either suddenly or gradually (e.g., in stages/intervals). For example, the animation may last a period of time (e.g., 2 seconds) or a number of frames (e.g., 20 screen refreshes).

If the animation transitions suddenly, the device 102 may display the modified display for the period of time or the number of frames and then display the normal display at the conclusion of the period of time or the number of frames. For example, the device 102 may display the modified display for 3 seconds and then display the normal display. If the animation transitions gradually, the device 102 may display the modified display at the beginning of the animation and transition through a series of intermediate stages/intervals before displaying the normal display after the period of time or the number of frames. For example, the device 102 may transition from the modified display to the normal display over 3 seconds, such as by initially displaying the modified display, displaying a first transition display after one second, displaying a second transition display after two seconds and displaying the normal display after three seconds. The period of time or number of frames may vary based on the content, an input prompting the animation, the device 102 and/or other factors. For example, an animation associated with a navigation link or bookmark may have a first period of time/number of frames, an animation associated with reflowing the content may have a second period of time/number of frames, an animation associated with a search command may have a third period of time/number of frames, etc.

An animation for a device 102 having a color display may have a fourth period of time/number of frames, while an animation for a device 102 having an electronic ink display may have a fifth period of time/number of frames. For example, the device 102 having the color display may have a screen refresh of 60 Hz, allowing a smoother transition from the modified display to the normal display. In contrast, the device 102 having the electronic ink display may only have a screen refresh of 10 Hz or less, decreasing a quality of the animation. In addition to affecting the length of the animation, the type of display may affect the type of animation. For example, the device 102 having the color display may apply a highlight effect to the primary text to distinguish the primary text, while also applying an emboldened effect to the primary text and/or secondary text. In contrast, the device 102 having the electronic ink display may apply an emboldened effect to the primary text without the highlighting. The device 102 may apply the emboldened effect to the secondary text, an alternate effect to the secondary text or may not modify the secondary text, based on user preference and/or settings of the device 102.

As illustrated in FIG. 6, the device 102 may apply (610) a first effect to primary text to generate modified primary text and apply (612) a second effect to secondary text to generate modified secondary text. As discussed above, the first effect and the second effect may modify a font and/or formatting of the primary text and the secondary text. For example, the device 102 may add a highlight, embolden, italicize, change a font size, change a type of font or the like.

The device 102 may set (614) non-emphasized text to partial opacity to generate modified non-emphasized text. For example, the device 102 may decrease an opacity of the non-emphasized text so that the non-emphasized text is faint or disappears entirely, increasing a visibility of the primary text. The opacity of the non-emphasized text may vary, from completely transparent (e.g., the non-emphasized text is not displayed) to slightly transparent (e.g., the non-emphasized text is a shade lighter than the primary text). In addition, the device 102 may modify a font or formatting of the non-emphasized text, similar to described above with regard to the primary text and/or secondary text, without departing from the present disclosure.

The device 102 may display (616) an initial rendering. The initial rendering may display a viewable frame including the modified primary text, the modified secondary text and/or the modified non-emphasized text. The initial rendering may display the full effects applied to the modified primary text, the modified secondary text and/or the modified non-emphasized text as performed by steps 612 and 614. In some examples, the secondary text is not displayed.

The device 102 may decrease (618) an effect on the primary and/or the secondary text to generate intermediate primary text and/or intermediate secondary text. For example, the device 102 may decrease an intensity value associated with highlighting or decrease an emboldening effect. Alternatively, the device 102 may maintain the effect on the primary text and/or the secondary text for a period of time and then decrease/remove the effect in stages or in a single step.

The device 102 may increase (620) an opacity of the non-emphasized text to generate intermediate non-emphasized text. In a first example, the device 102 may increase an opacity of the non-emphasized text by a first amount at a time, the first amount being a fraction of the total amount that the opacity was reduced in step 614. For example, if the total amount the opacity was reduced in step 614 was 80%, the device 102 may increase the opacity of the non-emphasized text by 8% at a time, requiring 10 intervals to reach full opacity.

As part of changing the opacity of the non-emphasized text, the device 102 may change the opacity of the non-emphasized text uniformly or non-uniformly. As an example of uniformly changing the opacity, an opacity of the non-emphasized text within the viewable frame may be increased similarly and the non-emphasized text may be slowly faded in as a group. As an example of non-uniformly changing the opacity, an opacity of the non-emphasized text within the viewable frame may be increased differently based on a position of the non-emphasized text within the viewable frame, such that first portions of the non-emphasized text are faded in more quickly than second portions of the non-emphasized text. Thus, the device 102 may dynamically determine an animation fade of the non-emphasized text.

An example of dynamically determining the animation fade may be to increase the opacity of the non-emphasized text using a gradient or a normal distribution. In a first example, an opacity of portions of the non-emphasized text closer to a center of the animation fade may increase at a faster rate than an opacity of portions of the non-emphasized text further from the center of the animation fade, such that the animation fades in using an inside-out approach. In a second example, the opacity of portions of the non-emphasized text further from the center of the animation fade may increase at a faster rate than the opacity of portions of the of the non-emphasized text closer to the center of the animation fade, such that the animation fades in using an outside-in approach. The device 102 may determine a position of a center of the animation fade based on location(s) of the primary text. For example, if the primary text includes a single region of primary text, the center of the animation fade may be positioned over the single region of primary text. If the primary text includes multiple regions of primary text, the position of the animation fade may vary. As a first example, the center of the animation fade may be positioned to be central to the multiple regions of primary text. As a second example, the animation fade may be centered on a single region of primary text. As a third example, a size of the animation fade may be reduced and the animation fade may be positioned on each of the multiple regions of primary text. Thus, the animation fades may encircle the multiple regions of primary text individually.

The device 102 may display (622) an animation rendering. The animation rendering may display the viewable frame including the intermediate primary text, the intermediate secondary text and/or the intermediate non-emphasized text. In some examples, the intermediate secondary text is not displayed. If step 622 is performed multiple times, the intermediate primary text, the intermediate secondary text and the intermediate non-emphasized text may be different as the animation transitions from the initial rendering to the final rendering.

The device 102 may determine (624) if the animation is complete. For example, the device 102 may determine if a period of time has elapsed, a number of frames have been displayed or a number of animation renderings have been displayed. If the animation is not complete, the device 102 may loop (626) to step 618 and repeats steps 618-622 for subsequent stages/intervals of animation. If the animation is complete, the device 102 may display (628) a final rendering. The final rendering may display the viewable frame including the primary text, the secondary text and/or the non-emphasized text. Thus, the content displayed in the viewable frame may have a uniform formatting and/or font.

FIGS. 7A-7G illustrate examples of animations according to embodiments of the present disclosure.

As illustrated in FIG. 7A, the device 102 may display an initial rendering having an embolden effect for primary text (e.g., "Liberty") in a first moment 710-1 and a second moment 710-2, and display a final rendering in a third moment 710-3.

As illustrated in FIG. 7B, the device 102 may display an initial rendering having a highlight effect for primary text (e.g., "Liberty") in a first moment 12-1, display an intermediate rendering having a faint highlight effect in a second moment 12-2, and display a final rendering in a third moment 712-3. The highlight effect may be in color, for example yellow.

As illustrated in FIG. 7C, the device 102 may display an initial rendering in a first moment 714-1, the initial rendering having an animation fade centered on the primary text (e.g., "Liberty") such that text outside a row of text including the primary text has a reduced opacity and text within the row of text has a normal opacity. The device 102 may display an intermediate rendering in a second moment 714-2 such that text in rows not adjacent to the row of text including the primary text has a reduced opacity and text within rows adjacent to the row of text has a normal opacity. The device 102 may display a final rendering in a third moment 714-3 such that the opacity of the text in the viewable frame is uniform.

As illustrated in FIG. 7D, the device 102 may display an initial rendering in a first moment 716-1, the initial rendering having primary text (e.g., "Liberty") with a normal opacity and non-emphasized text with a first opacity. The device 102 may display a first intermediate rendering in a second moment 716-2 such that the non-emphasized text has a second opacity greater than the first opacity. The device 102 may display a second intermediate rendering in a third moment 716-3 such that the non-emphasized text has a third opacity greater than the second opacity. Finally, the device 102 may display a final rendering in a fourth moment 716-4 such that the non-emphasized text and the primary text have a uniform opacity.

As illustrated in FIG. 7E, the device 102 may display an initial rendering in a first moment 718-1, the initial rendering having primary text (e.g., "Liberty") and secondary text (e.g., "conceived in") with a normal opacity and non-emphasized text with a first opacity. The device 102 may display a first intermediate rendering in a second moment 718-2 such that the non-emphasized text has a second opacity greater than the first opacity. The device 102 may display a second intermediate rendering in a third moment 718-3 such that the non-emphasized text has a third opacity greater than the second opacity. Finally, the device 102 may display a final rendering in a fourth moment 718-4 such that the non-emphasized text and the primary text have a uniform opacity.

Figure 7F:
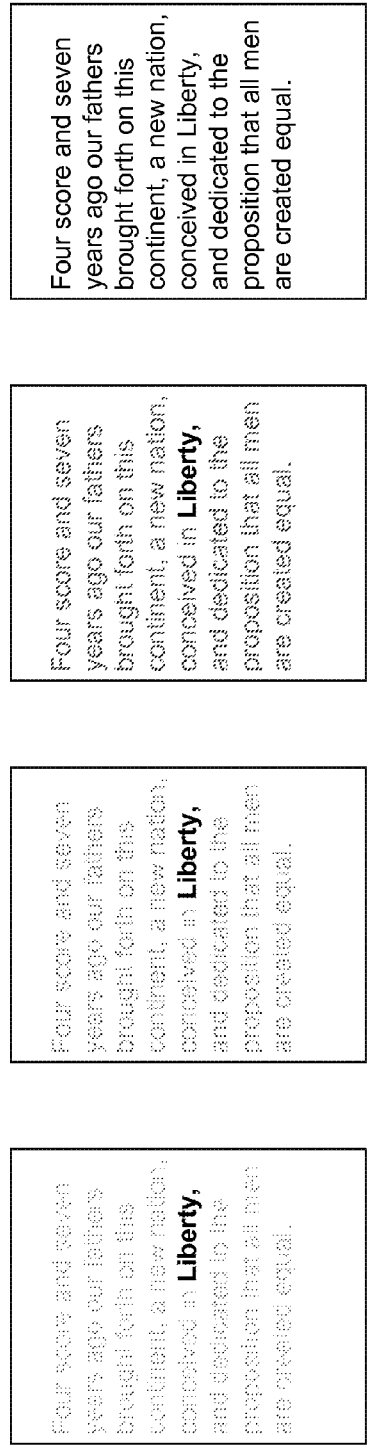

As illustrated in FIG. 7F, the device 102 may display an initial rendering in a first moment 720-1, the initial rendering having primary text (e.g., "Liberty") with a normal opacity, emboldened and highlighted, while non-emphasized text has a first opacity. The device 102 may display a first intermediate rendering in a second moment 720-2 such that the non-emphasized text has a second opacity greater than the first opacity. The device 102 may display a second intermediate rendering in a third moment 720-3 such that the non-emphasized text has a third opacity greater than the second opacity. Finally, the device 102 may display a final rendering in a fourth moment 720-4 such that the non-emphasized text and the primary text have a uniform opacity and uniform formatting, the emboldened and highlighted effect removed from the primary text.

Figure 7G:
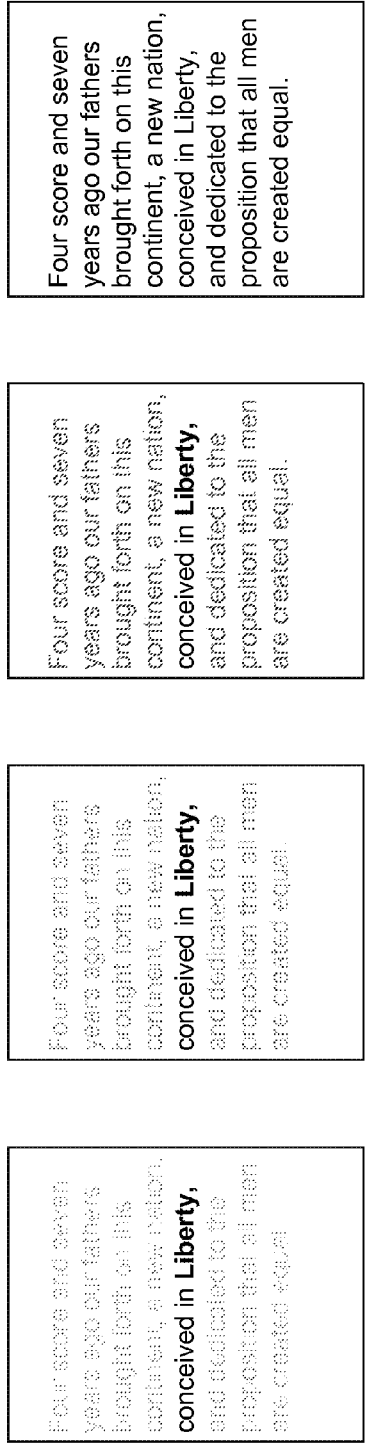

As illustrated in FIG. 7G, the device 102 may display an initial rendering in a first moment 722-1, the initial rendering having primary text (e.g., "Liberty") and secondary text (e.g., "conceived in") with a normal opacity while non-emphasized text has a first opacity. In addition, the primary text may be emboldened and highlighted. The device 102 may display a first intermediate rendering in a second moment 722-2 such that the non-emphasized text has a second opacity greater than the first opacity. The device 102 may display a second intermediate rendering in a third moment 722-3 such that the non-emphasized text has a third opacity greater than the second opacity. Finally, the device 102 may display a final rendering in a fourth moment 722-4 such that the non-emphasized text and the primary text have a uniform opacity and uniform formatting, the emboldened and highlighted effect removed from the primary text.

Although not discussed in detail above, other emphasizing and de-emphasizing techniques may be applied, such as changing the color of the text, calling out emphasized text by making it temporarily larger and smaller (in a pulsing effect), emitting a sound along with an animation of the primary text to combine the visual and audio cues, etc.

Figure 8:
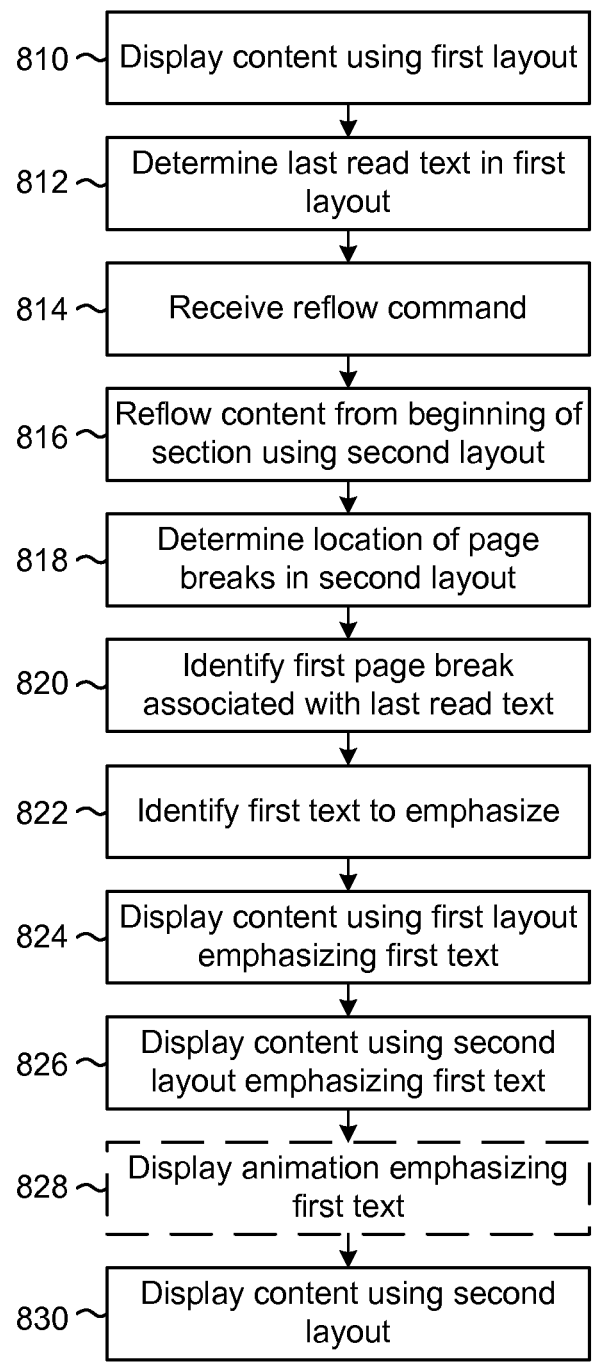
FIG. 8 is a flowchart conceptually illustrating an example method for animating emphasized text according to embodiments of the present disclosure.

FIG. 8 is a flowchart conceptually illustrating an example method for animating emphasized text according to embodiments of the present disclosure. For example, the device 102 may display content using a first layout (e.g., using a first font size) at a first time and may transition to displaying the content using a second layout (e.g., using a second font size) at a second time. To provide context for a user during the transition between the first layout and the second layout, the device 102 may display an animation emphasizing last read text by a user or other anchoring text in the first layout and the second layout.

As an example, the first layout may display the content on one page, whereas the second layout may display the content on two pages. Therefore, the second layout includes a first page break preceding the content and a second page break within the content. The device 102 may determine that last read text by a user is located after the second page break and would therefore be displayed on the second page of the second layout. To provide context for the user, the device 102 may display the first layout while emphasizing the last read text and then transition to displaying the second layout while emphasizing the last read text.

As another example, instead of determining last read text, the device 102 may determine contextual text or other anchoring text to emphasize. In the example above, the first layout displays content with the first page break preceding the content and the second page break embedded within the content. Each of the first page break and the second page break may be associated with contextual text, which may include a line of text, a sentence or a paragraph. Thus, contextual text may include a first sentence for the first page and a second sentence for the second page. To determine the contextual text to display, the device 102 may determine if the last read text is associated with the first page or the second page. For example, if the last read text is associated with the second page (e.g., located after the second page break), the device 102 may identify first text at the beginning of the second page. To provide context for the user, the device 102 may display the first layout while emphasizing the first text beginning at the second page break and then transition to displaying the second layout while emphasizing the first text.

The device 102 may display (810) content using a first layout. For example, the device 102 may display an electronic publication, electronic document, website, electronic content or the like. The device 102 may determine (812) last read text in the first layout. For example, as will be discussed in greater detail below with regard to FIGS. 10A-10C, the device 102 may determine the last read text based on user input, gaze tracking or determining a reading speed and an amount of time that the content has been displayed by the device 102. Alternatively, the device 102 may determine the last read text using methods known to one of skill in the art.

The device 102 may receive (814) a reflow command, which reflows content using a new layout due to changing a font or other setting or an orientation of the device 102. In response to the reflow command, the device 102 may reflow (816) content from beginning of a section using a second layout. The device 102 may determine (818) a location of page breaks in the second layout. For example, if the first layout includes more content than the second layout, the device 102 may determine the number of page breaks in the second layout to be greater than 1. If the first layout includes less content than the second layout, the device 102 may determine the number of page breaks in the second layout to be equal to 1. The device 102 may identify (820) a first page break associated with the last read text. For example, if the number of page breaks in the second layout is equal to 1, the top of the second layout is the first page break. Alternatively, if the number of page breaks in the second layout is greater than 1, the device 102 may identify the first page break immediately preceding the last read text. The device 102 may then identify (822) first text to emphasize. The first text to emphasize may be the beginning of the first page break. For example, the device 102 may identify a line of text, a sentence or a paragraph, depending on settings stored in the device 102. Alternatively, the first text to emphasize may be the last read text.

To provide context to the user during the transition from the first layout to the second layout, the device 102 may display (824) content using the first layout and emphasizing the first text. For example, the device 102 may display a full page of text with the first text highlighted, emboldened or otherwise emphasized, as discussed in greater detail above. The device 102 may then display (826) content using the second layout while emphasizing the first text. For example, the device 102 may display a half page of text with the first text highlighted, emboldened or otherwise emphasized. Optionally, the device 102 may display (828) an animation emphasizing the first text. Finally, the device 102 may display (830) the content using the second layout without emphasizing the first text. An example of the optional animation may include fading the highlighting or emboldening of the first text until the first text is uniform with the rest of the content. Additionally or alternatively, the optional animation may increase a transparency of non-emphasized text, as discussed above.

FIGS. 9A-9B illustrate examples of animations according to embodiments of the present disclosure. As illustrated in FIG. 9A, the device 102 may display content using a first layout (e.g., a first font size) in a first viewable frame 910-1. The device 102 may determine last read text in the first layout and receive a reflow command to switch to a second layout (e.g., a second font size). As will be discussed in greater detail below with regards to FIGS. 10A-10C, the device 102 may determine the last read text based on user input, gaze tracking or determining a reading speed and an amount of time that the first viewable frame 910-1 has been displayed by the device 102. The device 102 may reflow the content from the beginning of the section using the second layout and determine location of page breaks in the second layout compared to the first layout. Thus, the device 102 may identify a first page break associated with the last read text and identify first text (e.g., <I can stay a week," his daughter>) to emphasize at a beginning of the first page break. The device 102 may then display the content using the first layout in a second viewable frame 910-2, with the first text emphasized (e.g., in bold), before transitioning to displaying the content using the second layout in a third viewable frame 910-3, with the first text emphasized (e.g., in bold). Finally, the device 102 may display an optional animation and transition to displaying the content using the second layout in a fourth viewable frame 910-4 with the first text uniform with the remaining content. Thus, the device 102 may provide context for the user during the transition between the first layout and the second layout so that the user may identify where the first page break was located in the first layout and the second layout. Alternatively, the device 102 may emphasize the last read text without departing from the present disclosure.

FIG. 9B illustrates an animation transitioning from the second layout to the first layout. For example, the device 102 may display the second layout (e.g., the second font size) in a first viewable frame 912-1. The device 102 may determine last read text in the second layout and receive a reflow command to switch to the first layout (e.g. the first font size). The device 102 may reflow the content from the beginning of the section using the first layout and determine location of page breaks in the first layout compared to the second layout. As the second layout displays less content than the first layout, the device 102 identifies the first page break as preceding the first viewable frame 912-1. Thus, the device 102 may identify first text (e.g., <"I can stay a week," his>) to emphasize at the beginning of the first page break. The device 102 may then display the content using the first layout in a second viewable frame 910-2, with the first text emphasized (e.g., in bold), before transitioning to displaying the content using the second layout in a third viewable frame 910-3, with the first text emphasized (e.g., in bold). Finally, the device 102 may display an optional animation and transition to displaying the content using the second layout in a fourth viewable frame 910-4, in which the first text is uniform with the remaining content. Thus, the device 102 may provide context for the user during the transition between the second layout and the first layout so that the user may identify where the first page break was located in the second layout and the first layout. Alternatively, the device 102 may emphasize the last read text without departing from the present disclosure.

As mentioned above, the device 102 may emphasize text associated with bookmarks, reference locations, search commands, last read text or the like. The device 102 may determine the text to emphasize using one of several methods, such as a selection command input to the device 102, gaze tracking, reading speed estimation or the like. FIGS. 10A-10C are flowcharts conceptually illustrating example methods for selecting text according to embodiments of the present disclosure.

Figure 10A:
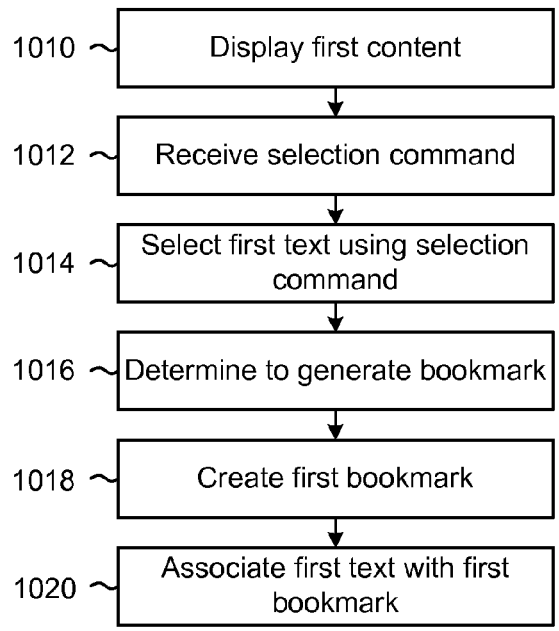
FIGS. 10A-10C are flowcharts conceptually illustrating example methods for selecting text according to embodiments of the present disclosure.

FIG. 10A illustrates a flowchart for creating a bookmark using a selection command input to the device 102. The device 102 may display (1010) first content, receive (1012) a selection command and select (1014) the first text using the selection command. For example, a user of the device 102 may interact with the display 104 of the device 102 to identify first text to select. Examples of identifying the text to select may include double tapping a location on the display 104 corresponding to the text, contacting the location on the display 104 for a duration of time exceeding a threshold, identifying a first location on the display 104 and a second location on the display 104 to select text between the first location and the second location, or the like.

The device 102 may determine (1016) to generate a bookmark. The device 102 may determine to generate the bookmark based on a bookmark command (e.g., the user uses a contextual menu to command the device 102 to create a bookmark), a drag command (e.g., the user interacts with the display 104 to drag the first text to a bookmark icon or a particular location on the display 104; alternatively, the user interacts with the display 104 to drag a bookmark icon to the first text), an exit command (e.g., the user commands the device 102 to exit a current application associated with the first text, such as by closing an electronic publication or document), a sleep command (e.g., the user commands the device 102 to turn off the display 104), a time delay (e.g., the device 102 detects no input for a duration of time exceeding a threshold), or the like. After determining to generate the bookmark, the device 102 may create (1018) the first bookmark and may associate (1020) the first text with the first bookmark.

While FIG. 10A illustrates the steps in a particular order, the disclosure is not limited thereto and the steps may occur out of order or concurrently. As an example, the device 102 may determine to generate a bookmark prior to selecting the first text. For example, the device 102 may receive a bookmark command and then receive a selection command, such as when the user clicks a bookmark button and then identifies text to select or when the user drags a bookmark button to particular text.

Using steps 1010-1020, the device 102 may generate automatically-created bookmarks (e.g., after selecting the text, the device 102 receives an exit command, a sleep command, a duration of time without input exceeds a threshold, or the like) or user-created bookmarks (e.g., after selecting the text, the device 102 receives a bookmark command, a drag command or the like). The device 102 may differentiate between the automatically-created bookmarks and the user-created bookmarks, such as by overwriting the automatically-created bookmarks while storing the user-created bookmarks. The device 102 may include index(es) for user-created bookmarks, automatically-created bookmarks and/or bookmarks in general. In addition, the device 102 may display a visual indicator for some bookmarks, such as a user-created bookmark, while displaying content associated with the bookmark.

Figure 10B:
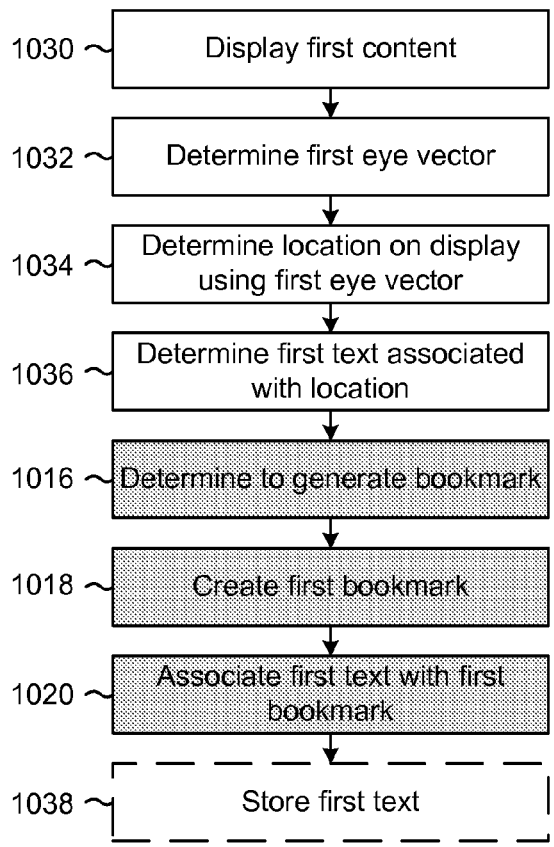

FIG. 10B illustrates a flowchart for creating a bookmark using gaze tracking. The device 102 may display (1030) first content. To perform gaze tracking, the device 102 may determine (1032) a first eye vector, determine (1034) a location on the display 104 using the first eye vector and may determine (1036) first text associated with the location on the display 104. Steps 1032-1036 are intended to illustrate an example of gaze tracking, but gaze tracking may be performed using any method known to one of skill in the art.

The device 102 may determine (1016) to generate a bookmark, create (1018) the first bookmark and associate (1020) the first text with the first bookmark, as discussed in greater detail above with regard to FIG. 10A. The device 102 may then optionally store (1038) the first text. For example, the device 102 may excerpt the first text and store the first text to display on a home screen of the device 102 in proximity to a visual indication of a publication including the first text.

As part of the gaze tracking in steps 1032-1036, the device 102 may track a user's gaze and identify the first text corresponding to the user's gaze at a discrete moment in time, such as when the device 102 determines to generate the bookmark in step 1016. However, the user's gaze may have shifted from a desired location and the first text selected may not be the intended text. For example, the user's gaze may have shifted to a bookmark icon to issue a bookmark command.

To potentially avoid this issue, the device 102 may continually track a user's gaze to determine the user's progress within the first content. For example, the device 102 may determine a furthest point viewed by the user while the first content is displayed. The furthest point viewed may be determined by location, such as the lowest row of text corresponding to the user's gaze at any point while the first content is displayed. However, while the furthest point may correspond to last read text by the user, the user's gaze may jump around the display 104 without reading the first content, so the furthest point may not correspond to the last read text. For example, the user may be reading a first paragraph on a page and glance down to see how many paragraphs remain on the page, or to view a page number, and then return to reading the first paragraph.

Therefore, the device 102 may determine the furthest point read by the user by continually tracking the user's gaze and a length of time associated with the user's gaze. Ideally, the device 102 may determine that the user's gaze corresponds to a steady progression through the first content, row by row, in a linear path. Thus, the device 102 may determine that the user's gaze proceeds at a steady pace and may select the first text based on the progress of the user through the first content. However, the user may glance down briefly and then resume reading the first paragraph. The device 102 may determine a length of time associated with the glance and may ignore the glance as it deviates from the user's steady progress. Additionally, the user may re-read a sentence or jump to a different paragraph within the first content. To correctly identify the most recent text read by the user (e.g., last read text), the device 102 may determine a location and a length of time associated with the gaze tracking and determine that the user's progress is continuing (e.g., if the user re-reads a first sentence, the last read text is the furthest point in a paragraph including the first sentence) or has restarted (e.g., if the user jumps to a new paragraph, whether above or below the previous last read text, the last read text is the furthest point in the new paragraph).

The first text may include a word, a line of text, a sentence or a paragraph. For precise estimations, the first text may be centered on a particular word or include a particular line determined as described above. However, the gaze tracking may not be precise and the user may need to reorient by reading from a beginning of a paragraph upon resuming reading at a second time. Thus, the device 102 may identify the first text as a word, line, sentence or the like at a beginning of a current paragraph. For example, if the most recent text read by the user is determined to be the 15th line, the device 102 may determine that the 15th line is included within a third paragraph in the first content and may select an initial sentence of the third paragraph as the first text.

Thus, the gaze tracking performed in steps 1032-1036 may store discrete locations and timestamps associated with the user's gaze and may keep track of cumulative progress throughout the first content. In addition, the device 102 may use the gaze tracking to determine an average reading speed of the user.

Figure 10C:
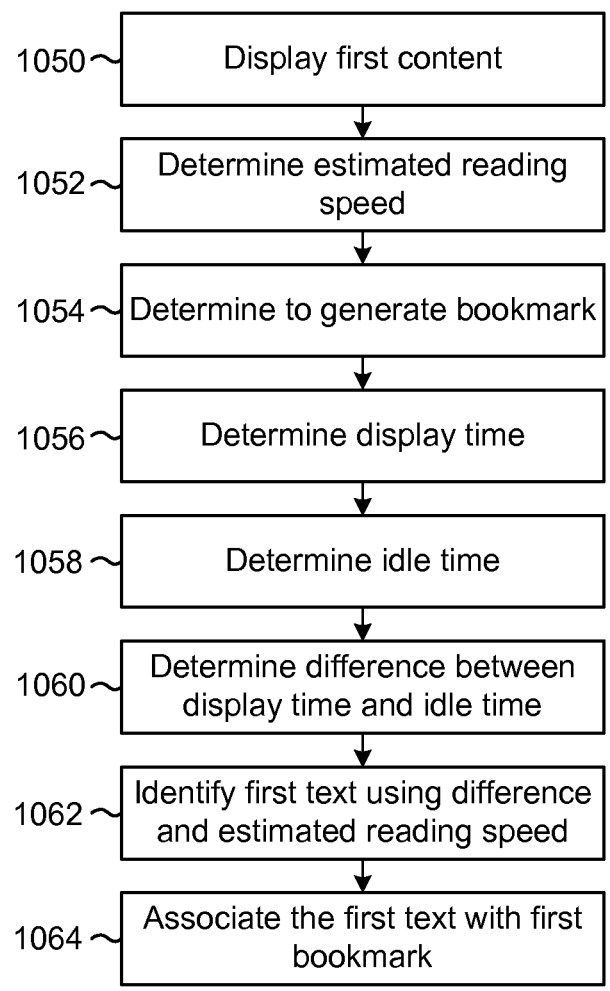

FIG. 10C illustrates a flowchart for creating a bookmark using an estimated reading speed. The device 102 may display (1050) first content and determine (1052) an estimated reading speed. The estimated reading speed may be based on gaze tracking, as discussed above, or based on an average page speed (e.g., length of time per page), an average sentence speed (e.g., length of time for a page divided by the number of sentences), an average line speed (e.g., length of time for a page divided by the number of lines on the page), or the like. In determining an average reading speed, the device 102 may ignore outliers such as rapidly scrolling through pages in a publication or the like.

The estimated reading speed may be determined for a first user based on time spent reading a current publication, an average reading speed for similar publications or an overall average reading speed for the first user. For example, a first reading speed associated with a first genre of fiction for the first user may be faster than a second reading speed associated with a second genre of nonfiction. Thus, if the current publication is associated with the first genre, the device 102 may use the first reading speed. Alternatively, the device 102 may use an average reading speed for the first user while reading the current publication, once an adequate amount of data is available to the device 102.

The estimated reading speed may also be based on an average reading speed for the current publication for all users or groups of users in addition to the first user. For example, the device 102 may use the average reading speed for all users while reading the current publication as the estimated reading speed for the current publication. Alternatively, the device 102 may determine the estimated reading speed using the average reading speed for all users and the average reading speed for the first user while reading the current publication. As a first example, the device 102 may use a weighted average to factor in the average reading speed for all users until the average reading speed for the first user is determined over an adequate number of pages. As a second example, the device 102 may compare an average reading speed for all users of the current publication to a general average reading speed for all users to determine if the current publication results in a lower or higher than average reading speed. The device 102 may then determine the estimated reading speed by increasing or decreasing the average reading speed of the first user.

The device 102 may determine the estimated reading speed based on a type of the device 102. For example, a user may have a first reading speed on a first device (e.g., a smart phone) and a second reading speed on a second device (e.g., a laptop). The first reading speed, the second reading speed and other average reading speeds may be associated with a user ID corresponding to the user and therefore shared amongst the first device, the second device and/or additional devices. Thus, the device 102 may use the type of device as a factor in comparing the first reading speed, the second reading speed and other average reading speeds to determine the estimated reading speed.

The device 102 may determine (1054) to generate a bookmark. The device 102 may determine to generate the bookmark based on a bookmark command (e.g., the user uses a contextual menu to command the device 102 to create a bookmark), an exit command (e.g., the user commands the device 102 to exit a current application associated with the first text, such as by closing an electronic publication or document), a sleep command (e.g., the user commands the device 102 to turn off the display 104), a time delay (e.g., the device 102 detects no input for a duration of time exceeding a threshold), or the like.

The device 102 may determine (1056) a display time, which is an amount of time the first content has been displayed prior to the device 102 determining to generate the bookmark, and determine (1058) an idle time, which is an amount of time the first content has been displayed without being viewed by the user prior to the device 102 determining to generate the bookmark. In some examples, the idle time may be approximated, such as by assuming the idle time is equal to the time delay prompting the device 102 to turn off the display 104. However, the device 102 may determine the idle time using other techniques without departing from the disclosure. As a first example, the device 102 may determine when the device 102 is put down, such as by using an accelerometer or other gyroscopic sensor, and may determine the idle time based on a duration of time the device 102 was motionless. As a second example, the device 102 may use gaze tracking to determine when the user views the display 104 and may determine the idle time based on a duration of time from a last detected view. As a third example, the device 102 may use accessory devices, such as devices monitoring biometric signals, to determine when the user stops viewing the display 104. In addition, the device 102 may determine when the user stops viewing the device using other methods known to one of skill in the art without departing from the disclosure.

The device 102 may determine (1060) a difference between the display time and the idle time. For example, the device 102 may subtract the idle time from the display time to determine a time spent reading. The device 102 may identify (1062) first text using the difference and the estimated reading speed and associate (1064) the first text with a first bookmark. For example, the device 102 may multiply the time spent reading (e.g., seconds) by the estimated reading speed (e.g., lines/seconds) to determine an amount read (e.g., lines) and select the first text based on the amount read. As an illustration, the device 102 may display the first content for 30 seconds prior to the user issuing a sleep command to turn off the display 104 of the device. The device 102 may determine that the first content includes 20 lines of text, the estimated reading speed is 30 lines per minute, the display time is 30 seconds and the idle time is 0 seconds. The device 102 may calculate the time spent reading (e.g., 30 seconds−0 seconds=30 seconds spent reading), multiply the time spent reading (e.g., 30 seconds) by the estimated reading speed (e.g., 30 lines/60 seconds=½ lines/second) to determine an amount read (e.g., 15 lines) and identify the first text as the 15th line of the first content. While the reading speed is illustrated as lines per minute, the reading speed may be calculated based on pages per minute, sentences per minute, lines per minute, words per minute or the like without departing from the disclosure. The device 102 may determine an amount of first content using whichever unit with which the reading speed is calculated and identify the first text similarly to the illustration provided above.

The first text may include a word, a line of text, a sentence or a paragraph. For precise estimations, the first text may be centered on a particular word or include a particular line determined as described above. However, reading speeds may vary and the user may not be continually reading the first content while the first content is displayed. Additionally, while the user may have read to a particular line at a first time, the user may need to reorient by reading from the beginning of a paragraph including the particular line upon resuming reading at a second time. Thus, the device 102 may identify the first text as a word, line, sentence or the like at a beginning of a current paragraph including the amount read. For example, if the amount read is determined to be 15 lines, the device 102 may determine that the 15th line is included within a third paragraph in the first content and may select an initial sentence of the third paragraph as the first text.

The device 102 may display the first content without the user viewing the first content for an indeterminate duration of time. In some examples, the duration of time may be equal to a first threshold, which is an amount of time that the device 102 displays the first content without detecting an input before the device 102 turns off the display 104. In other examples, the duration of time may exceed the first threshold, such as when the device 102 continues to detect input from the user despite the user not viewing the first content. When the idle time is ascertainable, the device 102 may calculate the time spent reading based on the idle time as described above. However, the idle time may be difficult to measure. Instead of determining the first text incorrectly, the device 102 may determine that the display time and/or the time spent reading exceeds a threshold and select a beginning of the first content being displayed as the first text. The device 102 may determine the threshold using the estimated reading speed and an amount of first content. For example, if the first content includes 20 lines of text and the estimated reading speed is 30 lines per minute, the user should read the first content in 40 seconds. The device 102 may set the threshold based on the amount read calculation, such as setting the threshold equal to the amount read (40 seconds), a multiple of the amount read (e.g., 1.5*40=60 seconds, 2*40=80 seconds, or the like), a fixed delay in addition to the amount read (e.g., 20 second delay, resulting in a threshold of 40+20=60 seconds), or the like.

Figure 11:
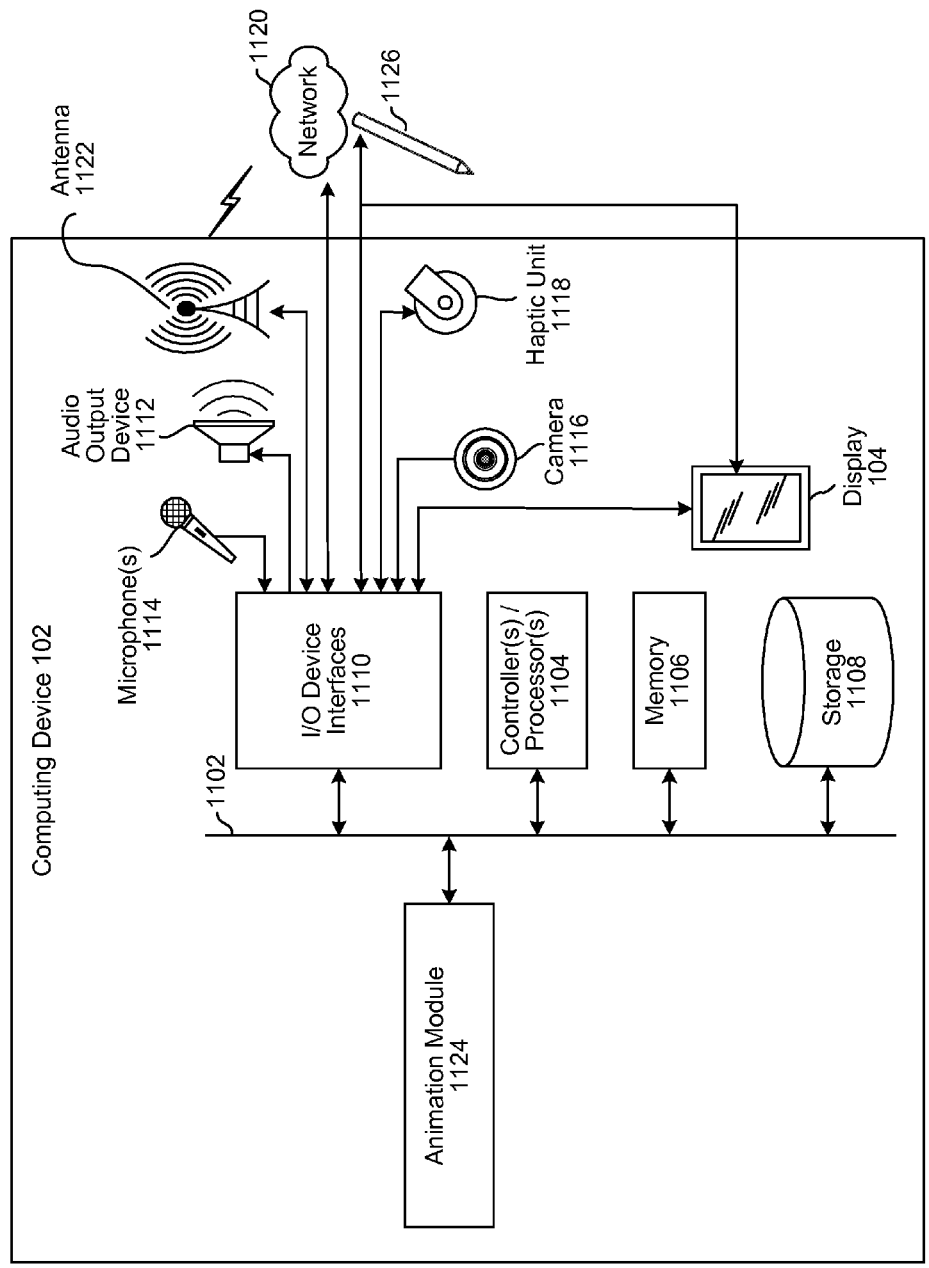
FIG. 11 is a block diagram conceptually illustrating example components of a computing device according to embodiments of the present disclosure.

FIG. 11 is a block diagram conceptually illustrating example components of a computing device 102. In operation, the computing device 102 may include computer-readable and computer-executable instructions that reside on the computing device 102, as is discussed further below. Components illustrated as part of the device 102 may be omitted, while other components not illustrated may also be included in the device 102. The device 102 may be a computer, set-top box or a portable device, such as an electronic reader, a smart phone, tablet, smart watch, or the like.

As illustrated in FIG. 11, the computing device 102 may include an address/data bus 1102 for conveying data among components of the computing device 102. Each component within the computing device 102 may also be directly connected to other components in addition to (or instead of) being connected to other components across the bus 1102.

The computing device 102 may include one or more microcontrollers/controllers/processors 1104 that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The computing device 102 may also include a data storage component 1108, for storing data and microcontrollers/controller/processor-executable instructions (e.g., instructions to perform one or more steps of the methods illustrated in and described with reference to FIGS. 1, 5, 4A-4D and 6). The data storage component 1108 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through input/output device interfaces 1110.

Computer instructions for operating the computing device 102 and its various components may be executed by the microcontroller(s)/controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The computing device 102 includes input/output device interfaces 1110. A variety of components may be connected through the input/output device interfaces 1110.

The computing device 102 further includes an animation module 1124 that may control filtering of an input to the device 102 as discussed above, specifically with regard to FIGS. 1, 4A-4D, 5 and/or 6. Some or all of the controllers/modules of the animation module 1124 may be executable instructions that may be embedded in hardware or firmware in addition to, or instead of, software. In one embodiment, the computing device 102 may operate using an Android® operating system (such as, Android® 4.3 Jelly Bean and/or Android® 4.4 KitKat).

A variety of components may be connected to the device 102 through the input/output device interfaces 1110, such as the display or display screen 104 having a touch surface or touchscreen; an audio output device for producing sound, such as speaker(s) 1112; one or more audio capture device(s), such as a microphone or an array of microphones 1114; one or more image and/or video capture devices, such as camera(s) 1116; one or more haptic units 1118; and other components. The display 104, speaker(s) 1112, microphone(s) 1114, camera(s) 1116, haptic unit(s) 1118, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104, as described above.

The input/output device interfaces 1110 may also include an interface for an external peripheral device connection such as universal serial bus (USB), FireWire, Thunderbolt, Ethernet port or other connection protocol that may connect to networks 1120. The input/output device interfaces 1110 may also include a connection to antenna 1122 to connect one or more networks 1120 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus 1126 may connect to the computing device 102 via one of these connections. The touchscreen of the display 104 and the stylus 1126 may also communicate data or operating information to one another to enable the computing device 102 to determine a position of the stylus 1126 relative to the touchscreen. The stylus 1126 may also communicate to the device 102 (either through the display 104) or otherwise, information about the stylus such as a stylus identifier, user identifier, or other information. Additionally, in some embodiments, the computing device 102 (for example, the touchscreen) and the stylus 1126 may communicate using electromagnetic communications (for example, electric fields generated by each device to transmit data on a carrier frequency), and/or haptic communications.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for associating a bookmark with words displayed on a device, the method comprising:

displaying, using an electronic reader device, a first page of text of an electronic publication on a display, the first page of text associated with a first layout and including a first amount of text;

selecting a first word in the first page of text;

associating the first word with a first bookmark, the first bookmark being a reference location in the electronic publication;

storing the first bookmark and a first word location of the first word;

determining to switch from the first layout to a second layout;

identifying a section break indicating a beginning of a current section, the current section including the first page of text;

determining the second layout of the current section;

identifying the first word using the first bookmark, the first word identified using the first word location; and displaying the second page of text in a manner to emphasize the first word relative to other words displayed with the first word, for a predetermined period of time, the second page of text associated with the second layout and including a second amount of text that is different from the first amount of text.

2. The computer-implemented method of claim 1, wherein the selecting further comprises:

receiving a selection command input to the device, the selection command identifying the first word using a user interface; and receiving a bookmark command input to the device, the bookmark command received from the user interface and causing the device to create the first bookmark by associating the first word with the first bookmark and storing the first bookmark and the first word location in the device.

3. The computer-implemented method of claim 1, wherein the selecting further comprises:

receiving a bookmark command, the bookmark command causing the device to create the first bookmark;

determining a length of time the first page of text has been displayed;

determining an estimated reading speed; and prior to the selecting, identifying the first word using the length of time and the estimated reading speed.

4. The computer-implemented method of claim 1, further comprising:

displaying a third page of text;

receiving a navigation command input to the device, the navigation command selecting the first bookmark using a user interface;

determining the first word associated with the first bookmark; and displaying the second page of text in a manner to emphasize the first word.

5. A computer-implemented method, comprising:

displaying, using a device, a first page of content associated with a first layout, the first page including a first amount of content;

selecting first content included in the first page;

associating the first content with a first bookmark;

storing the first bookmark and a first word location of the first content associated with the bookmark;

determining to switch from the first layout to a second layout;

identifying a section break indicating a beginning of a current section, the current section including the first page;

determining the second layout of the current section; and displaying a second page of content in a manner to emphasize the first content relative to other content displayed with the first content, for a predetermined period of time, the second page of content associated with the second layout and including a second amount of content that is different from the first amount of content.

6. The computer-implemented method of claim 5, further comprising:

receiving a selection command identifying the first content; and receiving a bookmark command causing the device to create the first bookmark.

7. The computer-implemented method of claim 5, wherein the selecting further comprises:

receiving a bookmark command causing the device to create the first bookmark;

determining a length of time the first page has been displayed;

determining an estimated reading speed; and determining the first content using the length of time and the estimated reading speed.

8. The computer-implemented method of claim 5, wherein the selecting further comprises:

determining a first eye vector describing at least a direction from the device to an eye position of a user's eye relative to the device;

determining a display position on a display of the device using the first eye vector; and determining the first content associated with the display position.

9. The computer-implemented method of claim 5, further comprising:

receiving a sleep command at a first time, the sleep command causing the device to create the first bookmark and deactivate the display;

receiving a wake command at a second time, the wake command causing the device to activate the display, the second time being after the first time;

identifying the first bookmark;

determining the first content associated with the first bookmark; and displaying the first page in a manner to emphasize the first content.

10. The computer-implemented method of claim 5, further comprising:

identifying a change in layout of a current section including the first page;

identifying a section break indicating a beginning of the current section;

determining a new layout of the current section; and displaying a second page using the new layout in a manner to emphasize the first content.

11. The computer-implemented method of claim 5, further comprising:

displaying a visual indication of an electronic publication, the electronic publication including the first content; and displaying the first content in proximity to the electronic publication.

12. The computer-implemented method of claim 5, further comprising:

displaying a third page of content;

receiving a navigation command, the navigation command selecting the first bookmark;

determining the first content associated with the first bookmark; and displaying the second page in a manner to emphasize the first content.

13. A computing device, comprising:
at least one processor;
a memory device including instructions operable to be executed by the at least one processor to cause the device to execute the method of:
  display a first page of content associated with a first layout, the first page including a first amount of content;
  select first content included in the first page;
  associate the first content with a first bookmark;
  store the first bookmark and a first word location of the first content associated with the bookmark;
  determine to switch from the first layout to a second layout;
  identify a section break indicating a beginning of a current section, the current section including the first page;
  determine the second layout of the current section; and
  display a second page of content in a manner to emphasize the first content relative to other content displayed with the first content, for a predetermined period of time, the second page of content associated with the second layout and including a second amount of content that is different from the first amount of content.

14. The computing device of claim 13, wherein the instructions further configure the system to:
  receive a selection command identifying the first content; and
  receive a bookmark command causing the device to create the first bookmark.

15. The computing device of claim 13, wherein the instructions further configure the system to:
  receive a bookmark command causing the device to create the first bookmark;
  determine a length of time the first page has been displayed;
  determine an estimated reading speed; and
  determine the first content using the length of time and the estimated reading speed.

16. The computing device of claim 13, wherein the instructions further configure the system to:
  determine a first eye vector describing at least a direction from the device to an eye position of a user's eye relative to the device;
  determine a display position on a display of the device using the first eye vector; and
  determine the first content associated with the display position.

17. The computing device of claim 13, wherein the instructions further configure the system to:
  receive a sleep command at a first time, the sleep command causing the device to create the first bookmark and deactivate the display;
  receive a wake command at a second time, the wake command causing the device to activate the display, the second time being after the first time;
  identify the first bookmark;
  determine the first content associated with the first bookmark; and
  display the first page in a manner to emphasize the first content.

18. The computing device of claim 13, wherein the instructions further configure the system to:
  display a third page of content;
  receive a navigation command, the navigation command selecting the first bookmark;
  determine the first content associated with the first bookmark; and
  display the second page in a manner to emphasize the first content.

19. The computing device of claim 13, wherein the instructions further configure the system to:
  display a visual indication of an electronic publication, the electronic publication including the first content; and
  display the first content in proximity to the electronic publication.

* * * * *